(12) United States Patent
Kumar et al.

(10) Patent No.: US 11,269,641 B2
(45) Date of Patent: Mar. 8, 2022

(54) BRANCH TARGET BUFFER FOR A DATA PROCESSING APPARATUS

(71) Applicant: THE UNIVERSITY COURT OF THE UNIVERSITY OF EDINBURGH, Edinburgh (GB)

(72) Inventors: Rakesh Kumar, Edinburgh (GB); Boris Grot, Edinburgh (GB); Vijay Nagarajan, Edinburgh (GB); Cheng Chieh Huang, Edinburgh (GB)

(73) Assignee: THE UNIVERSITY COURT OF THE UNIVERSITY OF EDINBURGH, Edinburgh (GB)

( * ) Notice: Subject to any disclaimer, the term of this patent is extended or adjusted under 35 U.S.C. 154(b) by 227 days.

(21) Appl. No.: 16/483,198

(22) PCT Filed: Feb. 1, 2018

(86) PCT No.: PCT/GB2018/050294
§ 371 (c)(1),
(2) Date: Aug. 2, 2019

(87) PCT Pub. No.: WO2018/142140
PCT Pub. Date: Aug. 9, 2018

(65) Prior Publication Data
US 2020/0004543 A1 Jan. 2, 2020

(30) Foreign Application Priority Data

Feb. 3, 2017 (GB) ..................................... 1701841

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/3804* (2013.01);
(Continued)

(58) Field of Classification Search
None
See application file for complete search history.

(56) References Cited

U.S. PATENT DOCUMENTS 5,996,071 A 11/1999 White
6,134,649 A 10/2000 Witt
(Continued)

FOREIGN PATENT DOCUMENTS

WO 2005060458 A2 7/2005

OTHER PUBLICATIONS

'Instruction Cache Prefetching Using Multilevel Branch Prediction' by Alexander V. Veidenbaum et al., University of Illinois at Chicago, Aug. 10, 2017. (Year: 2017).*
(Continued)

*Primary Examiner* — Steven G Snyder
(74) *Attorney, Agent, or Firm* — Dickinson Wright PLLC

(57) ABSTRACT

A data processing apparatus is provided having branch prediction circuitry, the branch prediction circuitry having a Branch Target Buffer, BTB. A fetch target queue receives entries corresponding to a sequence of instruction addresses, at least one of the sequence having been predicted using the branch prediction circuitry. A fetch engine is provided to fetch instruction addresses taken from a top of the fetch target queue whilst a prefetch engine sends a prefetch probe to an instruction cache. The BTB is to detect a BTB miss when attempting to populate a storage slot of the fetch target queue and the BTB triggers issuance of a BTB miss probe to the memory to fetch at least one instruction from the memory to resolve the BTB miss using branch-prediction based prefetching.

19 Claims, 13 Drawing Sheets

(52) U.S. Cl.
CPC .......... *G06F 9/3814* (2013.01); *G06F 9/3844* (2013.01); *G06F 9/3861* (2013.01)

(56) References Cited

U.S. PATENT DOCUMENTS

| | | | | |
|---|---|---|---|---|
| 7,096,348 | B2* | 8/2006 | Moyer | G06F 9/3806 712/237 |
| 7,702,888 | B2 | 4/2010 | Evers | |
| 7,895,422 | B2* | 2/2011 | Moyer | G06F 9/3814 712/239 |
| 7,937,573 | B2* | 5/2011 | Moyer | G06F 9/3804 712/238 |
| 8,205,068 | B2* | 6/2012 | Moyer | G06F 9/3844 712/238 |
| 2015/0268961 | A1* | 9/2015 | Zuraski | G06F 9/3804 712/207 |
| 2017/0090935 | A1* | 3/2017 | Falsafi | G06F 12/0875 |
| 2019/0155608 | A1* | 5/2019 | Perais | G06F 9/3806 |
| 2021/0004233 | A1* | 1/2021 | Kumar | G06F 9/3804 |

OTHER PUBLICATIONS

Reinman G et al: Fetch Directed Instruction Prefetching, Micro-32, Proceedings of the 32nd, Annual ACM/IEEE International Symposium on Microarchitecture, Nov. 16-18, 1999; pp. 16-27, Los Alamitos, CA.

Cansu Kaynak et al., Confluence: unified instruction supply for scale-out servers, Proceedings of the 48th International Symposium on Microarchitecture, Jan. 1, 2015, pp. 166-177, New York, New York.

International Search Report, for International Application No. PCT/GB2018/050294; dated Apr. 24, 2018.

* cited by examiner

BRANCH TARGET BUFFER FOR A DATA PROCESSING APPARATUS

CROSS-REFERENCE TO RELATED APPLICATIONS

The present application is a Section 371 National Stage of International Application PCT/GB2018/050294, filed 1 Feb. 2018, and through which priority is claimed to UK Patent Application 1701841.7, filed 3 Feb. 2017.

FIELD OF THE INVENTION

Examples described herein generally relate to branch prediction for a data processing apparatus and more specifically relate to circuitry for resolving a branch target buffer miss for a program counter corresponding to a branch instruction.

BACKGROUND OF THE INVENTION

As processor technology advances, with on-chip processor core count increasing, memory bandwidth may be more of a performance-limiting aspect than processor speed. Memory latency can be alleviated by techniques such as the use of cache memory, multithreading or instruction prefetching. However, increasing cache size may consume precious integrated circuit area and can be energy intensive. Multithreading can enhance performance of parallel applications only, not serial applications. Prefetching has comparatively low energy penalties and chip area penalties and may be applicable to serial as well as parallel applications. Prefetching is often implemented in, for example, high performance processors intended for non-consumer workstations, servers and embedded systems. However, simple prefetchers may have limited coverage and/or accuracy, whilst more complex prefetchers may require hundreds of kilobytes of metadata to operate.

Branch target buffers (BTBs) can be used to allow for prediction of branch target addresses at an instruction fetch stage instead of waiting for a branch target to become available after decoding of a branch instruction. Thus a BTB can be used reduce wasted processing cycles being associated with a branch instruction, although for large instruction footprints not all branch instructions can have entries in a BTB of fixed capacity.

Processing workloads such as server workloads may involve software having large instruction footprints with deep-layered software stacks that may have an active instruction working set comprising megabytes of instructions. The large instruction footprint and limited available cache capacity can result in a cache problem whereby many cache misses occur during execution, resulting in processing delays due to fetching instructions and data from lower level (slower) memory.

A large instruction footprint can also cause a BTB problem where no matching entry for an instruction is found in the BTB for some branch instructions being fetched, resulting in a next sequential instruction in a linear sequence being fetched in error. This erroneous fetch may involve subsequent flushing of the instruction pipeline and associated delays. To capture tens of thousands of branch targets that may be found in, for example, server workloads, over 100 kilobytes of BTB storage may be desired.

Solutions to the cache problem and to the BTB problem could potentially give more energy-efficient processors.

BRIEF DESCRIPTION OF THE DRAWINGS

Examples of the present technique are further described hereinafter with reference to the accompanying drawings, in which.

DETAILED DESCRIPTION

There is a need for solutions to the cache problem and the BTB problem to be found. Ideally, this would be achieved without unduly increasing the silicon footprint of the BTB or the cache memory and without creating onerous storage demands for metadata associated with instruction control flow.

Figure 1:
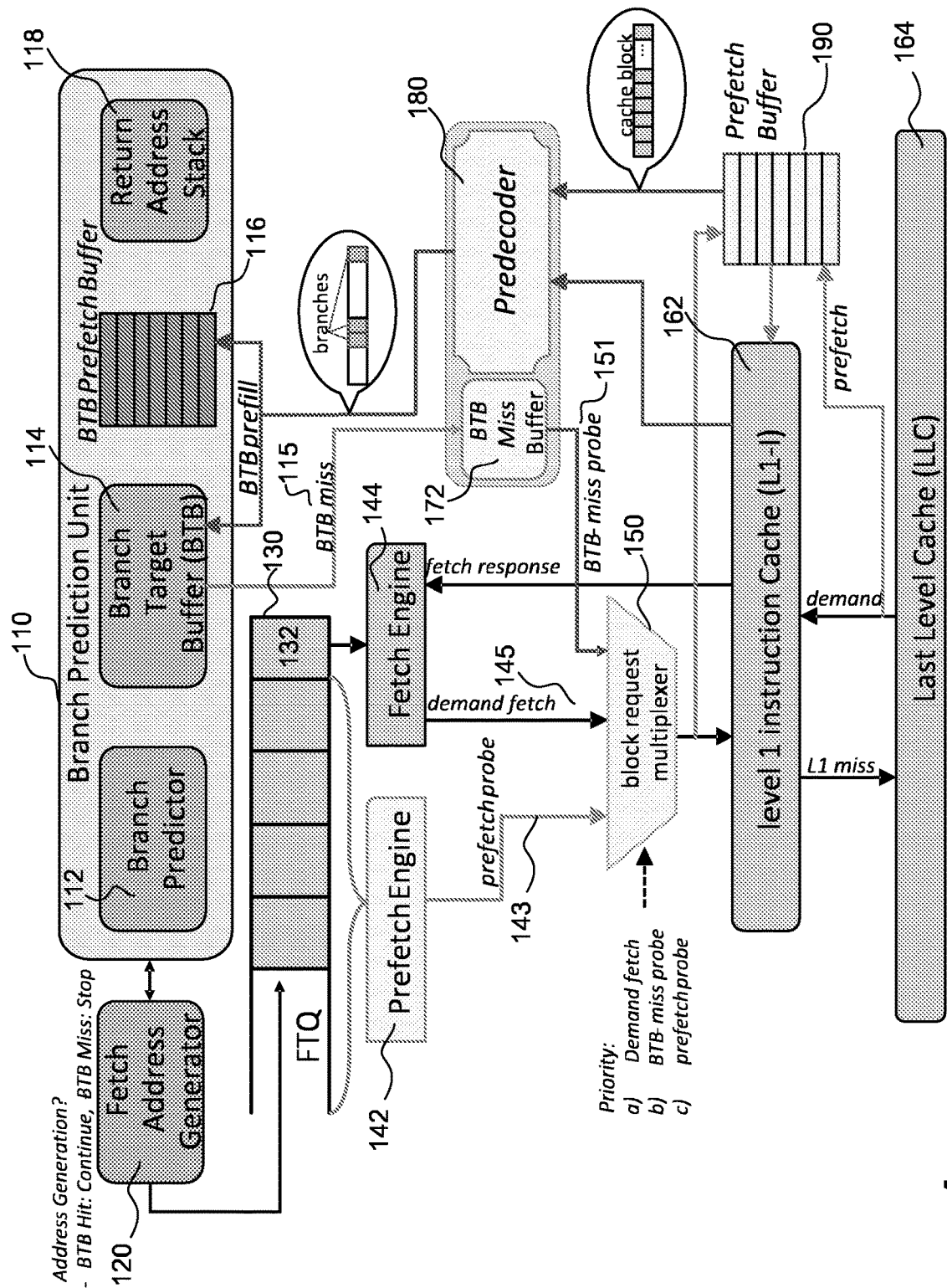
FIG. 1 schematically illustrates a data processing apparatus to perform branch prediction and instruction fetching according to the present technique.

FIG. 1 schematically illustrates a data processing apparatus to perform branch prediction and instruction fetching. The apparatus comprises a branch prediction unit 110 comprising a branch predictor 112, a branch target buffer (BTB) 114, a BTB prefetch buffer 116 and a return address stack 118. A fetch address generator 120 generates instruction addresses to populate entries of a fetch target queue (FTQ) 130. The apparatus further comprises a prefetch engine 142 and a fetch engine 144, each of which takes instruction addresses from entries of the FTQ 130. In this example. The FTQ 130 operates on a first-in-first out basis.

The return address stack 118 is a fixed size stack of return addresses that generate predictions for return instructions, but not for procedure call instructions. The BTB 114 may be used to predict target addresses of all branches. The BTB contains information indicating that an instruction having a matching entry (a "hit") is a branch instruction and, if so, what a corresponding predicted branch target address is. In the absence of the BTB 114, the branch target address and the instruction type (branch or non-branch) would not be available at a fetch stage of an instruction pipeline, but would only become available after decoding.

The prefetch engine 142 and the fetch engine 144 each output one or more signals to a block request multiplexer 150 that provides an interface to a memory system of the data processing apparatus comprising at least a Level 1 instruction cache (L1 I-cache) 162 and a last level cache (LLC) 164. In this description, the term memory may refer to L1 cache memory, lower level cache memory, main memory or any other memory accessible to the data processing apparatus. The prefetch engine 142 outputs a prefetch probe 143 to check for the presence of instruction(s) corresponding to a occupied FTQ entries in the L1 I-cache 162 and if the prefetch probe 143 encounters a miss in the L1 I-cache 162, the L1 I-cache 162 may generate an access to the LLC 164 to bring the missing block into the L1 I-cache 162. The fetch engine 144 outputs a demand fetch signal 145 to the block request multiplexer 150, demanding retrieval of instruction(s) corresponding to a PC from the L1 I-cache 162 or the LLC 164. The block request multiplexer 150 is arranged to receive an input signal in the form of a BTB miss probe 151 from a BTB miss buffer 172 in response to output of a BTB miss signal 115 by the BTB 114. The BTB miss signal 115 indicates that a BTB miss has been detected by the branch prediction circuitry 110 in response to a BTB look-up performed for a current value of a program counter. In this example the BTB miss is known to be a genuine BTB miss associated with a branch instruction program counter (PC) that does not currently have an entry in the BTB and not a miss associated with lookup of a PC for a non-branch instruction.

A predecoder 180 is arranged to predecode instructions received from blocks of cache memory, i.e. from one of the L1 I-cache 162 or the LLC 164, to enable identification any branch instructions within the retrieved cache block and their corresponding target addresses. Whether or not an instruction is a branch instruction, a type of the branch instruction and a branch target are not known without decoding the instruction. In the example of FIG. 1, the BTB miss probe 151 is issued by the BTB miss buffer 172, but in alternative examples the BTB miss probe, which is triggered by detection of a BTB miss in the BTB (indicated by the BTB miss signal 115), may be issued in response to the trigger by, for example, by the branch prediction unit 110 (e.g. directly from the BTB 114), by the fetch address generator 120, by the prefetch engine 142, by a dedicated BTB miss probe generator circuit or any convenient circuit in the data processing apparatus.

A prefetch buffer 190 is arranged to store instructions retrieved from the LLC 164 in response to a prefetch probe 143 output by the prefetch engine 142. The prefetch probe 143 checks the L1 I-cache 162 to establish whether or not it contains a cache block corresponding to an entry from the FTQ 130 being prefetched, without requiring the cache block to be returned from the memory. If the L1 I-cache 162 does not contain the cache block being probed, then a fetch request is issued to the LLC 164 and the corresponding prefetched instruction(s) returned from the LLC 164 are stored as an entry in the prefetch buffer 190. This entry in the prefetch buffer 190 may subsequently be moved to the L1 I-cache 162 upon a demand fetch request for the corresponding PC from the fetch engine 144.

The pre-decoder 180 may decode instructions read from either the L1 I-cache 162 or from the prefetch buffer 190 to identify one or more branch instructions and corresponding branch targets contained therein for the purpose of pre-filling at least one of the BTB 114 or the BTB prefetch buffer 116. The branch instruction address and corresponding branch target address matching a PC for which the BTB miss was encountered is identified from the output of the predecoder 180 and stored in the BTB 114. Any other branch instruction addresses and corresponding branch target addresses from the output of the predecoded cache block(s), such as a subsequent branch instruction following the branch instruction stored in the BTB 114, may be stored in the BTB prefetch buffer 116.

The FTQ 130 comprises a plurality of storage slots to receive entries corresponding to individual instructions or "basic blocks" of instructions to be prefetched by the prefetch engine 142 or to be fetched by the fetch engine 144. For the purposes of this specification a "basic block" is defined to be a sequence of straight-line instructions that end in a branch. The nature of this definition means that basic blocks can be of variable size depending on the number of instructions preceding the branch instruction. The fetch engine 144 issues a demand fetch instruction 145 to the block request multiplexer 150 and awaits a fetch response from the L1 I-cache 162 before proceeding to fetch a next instruction from the top of the FTQ 130. The prefetch engine 142 prefetches instructions from FTQ slots other than the top slot 132 so that it runs ahead of the fetch engine 144. The prefetch engine 142 issues the prefetch probe 143 to determine whether or not the corresponding instruction or basic block is present in the memory comprising the L1 I-cache 162. If it is not present in the L1 I-cache 162 then the data is can be retrieved from the LLC 164 or lower level memory. In the event of a BTB miss being detected for an entry of the FTQ 130, resulting in output of the BTB miss signal 115, the block request multiplexer 150 is arranged to associate different priorities to: (i) the demand fetch issued by the fetch engine 144; (ii) the BTB miss probe 151 output by the BTB miss buffer 172; and (iii) the prefetch probe 143 output by the prefetch engine 142. The block request multiplexer 150 may be arranged to assign a higher priority to servicing the BTB miss probe 151 than a priority assigned to servicing the prefetch probe 143. However, the demand fetch signal 145 may have a higher priority than both the BTB miss probe 151 and the prefetch probe 143 to allow the fetch engine to progress through the FTQ 132 without impediment.

The BTB 114 is a fixed size hashtable that maps a program counter to a branch target address. For example if a current PC=10 then the BTB is searched for an entry marked with a PC of 10. If a matching entry is found in the BTB 114, i.e. if there is a BTB "hit" this indicates a branch instruction is being fetched for execution and gives a predicted target address of the branch. A BTB miss (i.e. a non-match in the BTB for a current program counter) in previously known systems would convey little information because there would be no way to distinguish between: (i) the current PC corresponding to a non-branch instruction; and (ii) the PC corresponding to a branch instruction for which no entry is currently stored in the BTB. As will be explained more fully below, in examples according to the present technique, the BTB 114 is able to reliably discriminate between a current PC corresponding to a branch instruction for which no entry is currently stored in the BTB and a current PC corresponding to a non-branch instruction, in the event that no match is found in the BTB 114 for a current PC. This is possible due to storing BTB entries comprising basic blocks of instructions instead of individual instructions. The BTB 114 may also store branch prediction statistics indicating the level of confidence in an associated predicted branch target address stored in the BTB 114. Branching is expensive computationally in a pipelined processor because even unconditional branches may require interruption of a sequence of instruction fetch operations to restart the instruction stream from a new memory location (PC) corresponding to the branch target address. In this case instruction(s) that that may have already been fetched from memory and are waiting in instruction buffers or cache lines are likely to have to be discarded as a result of the switch to the new PC when the branch is taken.

Conditional branches may have to wait for operands to be generated or status bits to be set before the direction of the branch (i.e. branch taken or not) can be determined. A processor may have fetched and partially executed a number of instructions beyond the branch before it is known whether or not the branch should be taken. In examples according to the present technique, this may be avoided.

The branch target addresses stored in the BTB 114 may be updated based on the actual execution data after "retirement" of the instructions from the pipeline to improve the accuracy of the BTB predictions. The BTB 114 of the example of FIG. 1 performs the mapping of the current program counter to a basic block of instructions instead of to an individual branch instruction and entries of the FTQ 130 may also be at basic block granularity. A basic block may in some cases be smaller than a cache block and in other cases be larger than a cache block. Populating the BTB 114 with basic block entries allows the data processing apparatus to more readily distinguish between a non-branch instruction being looked up in the BTB 114 and a "genuine" BTB miss. The storage of BTB entries at a granularity of a basic blocks may guarantee that each BTB entry contains exactly one branch instruction whose target is another BTB entry. This means that if a BTB look-up fails to return a valid entry for a current program counter then may be treated as a genuine BTB miss rather than being the consequence of looking up a non-branch instruction.

The BTB populated by basic blocks may be accessed with the first address in the basic block. For example, consider the following basic block with three instructions:
A: add
B: sub
C: branch <branch marks end of basic block>
D:
In this case, the BTB 114 may be accessed with address of first instruction which is "A". A hit in BTB for this block should indicate that the size of basic block is three instructions. So, if the branch (at address C) is predicted to be "not taken" the next access to the BTB 114 will be with address D (next sequential address to C).

A BTB entry corresponding to a basic block is created when filling a BTB miss in the BTB 114 (see process element 320 in the flowchart of FIG. 3 described below). A basic block may also be created when the instructions are "retired" from the pipeline, having finished execution correctly. When a branch instruction is retired, a BTB entry corresponding to the basic block is created and saved, or alternatively, if a corresponding entry is already present in the BTB, the entry is updated. The updating relates to the branch prediction statistics which feedback to improve the accuracy of the branch prediction.

In the event of a BTB miss corresponding to an attempted look-up of the current PC, then the branch target of the basic block look-up that triggered the BTB miss is not known. For this reason the PC is not inserted in the FTQ 130, but instead is stored in the BTB miss buffer 172 until the BTB miss is resolved using the predecoder 180 and possibly also using the prefetch buffer 190. The BTB miss probe 151 can eventually result in the BTB miss being resolved by identifying the appropriate branch instruction address and corresponding branch target address, corresponding to the PC for which the BTB miss was encountered, via the predecoder 180.

In the FIG. 1 example, each entry of the FTQ 130 may contain information about a basic block, for example, the start address of the basic block, the number of instructions in basic block, etc. Therefore, if there are three instructions in a basic block, the FTQ entry may contain the address of first instruction and also specify that there are three instructions so that fetch engine 144 knows how many instructions to fetch starting from the first address of the basic block. The fetch engine 144 reads the head of the FTQ 130 comprising the top FTQ entry 132 and issues a non-zero integer number, N, of demand fetch requests to the I-cache where N refers to an instruction fetch width. Depending upon implementation, the fetch engine 144 may wait for a response before issuing subsequent fetch requests. This corresponds to an in-order fetch policy and thus if the instructions corresponding to a demand fetch signal 145 are not found in the L1 I-cache 162, then the fetch engine 144 may stall until the requested data is returned from the LLC 164 and written to the L1 I-cache 162. In alternative examples, each FTQ entry or at least a non-zero subset of the FTQ entries may comprise a single instruction address, although the basic block FTQ entries are more economical with storage space in memory.

The prefetching of instructions performed by the prefetch engine 142 is performed to appropriately populate the L1 I-cache 162 in readiness for demand fetch instructions to be subsequently issued by the fetch engine 144. According to the present technique, at least a subset of an incoming instruction prefetch stream based on the FTQ 130 is exploited for the purposes of at least one of pre-filling the BTB 114 or populating the BTB prefetch buffer 116. The subset of the prefetch stream used corresponds to BTB miss-probe triggered cache blocks. Thus, branch-prediction based instruction prefetching is used to populate both the L1 I-cache 162 and the BTB 114. This can be implemented without any modifications to accommodate storage of a large volume of metadata and can use existing branch-prediction driven prefetch circuitry. The modifications to the data processing apparatus to implement the BTB fill in response to a genuine BTB miss comprise adding the BTB miss buffer 172, the BTB prefetch buffer 116 and the block request multiplexer 150. The predecoder 180 allows branch instructions and branch targets to be identified in the prefetched cache blocks.

Figure 2:
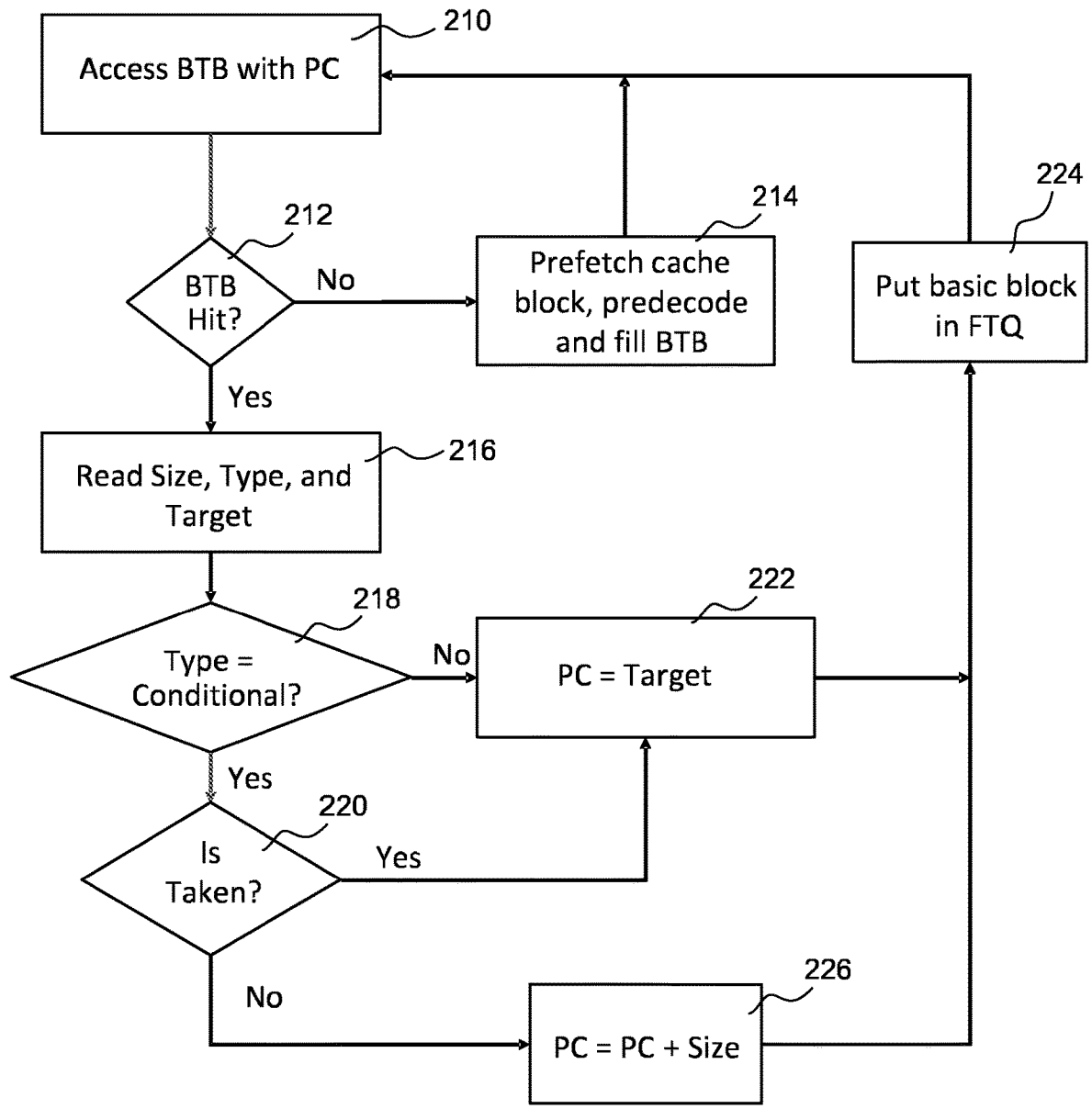
FIG. 2 is a flowchart schematically illustrating fetch address generation associated with the branch prediction unit of FIG. 1.

FIG. 2 schematically illustrates the process of address generation in the data processing apparatus according to FIG. 1. The address generation may be performed by the fetch address generator 120 of FIG. 1. At process element 210, when the fetch address generator 120 generates a PC indicating next instruction to be fetched, if the instruction is identified as a branch instruction then the branch predictor circuitry 112 is used to determine whether a next instruction in sequence should be located a at a next sequential address corresponding to the current PC corresponding to a non-branch instruction. Alternatively, the next instruction may be at a non-sequential address as would be the case for an unconditional branch or a conditional branch for which the branch condition has been satisfied. Thus at process element 210, the PC is used to access the BTB 114.

Next at process element 212 it is established whether or not there is hit in the BTB. A BTB hit means that the PC has been successfully mapped to a basic block of instructions in the BTB that contains a terminating branch instruction. In this case an associated branch target address may be retrieved from the BTB to specify a next instruction address for populating the FTQ 130, depending upon the predicted outcome of the branch instruction. If there is a BTB miss at process element 212, then the process proceeds to stage 214 where the BTB miss is resolved by prefetching a cache block corresponding to the PC value that resulted in the BTB miss and using the pre-decoder 180 of FIG. 1 to identify an appropriate terminating branch target address for the basic block corresponding to the PC and to fill the BTB 114 with a basic block entry to resolve the BTB miss. If on the other hand at process element 212 there is a BTB hit then the process proceeds to stage 216 where the basic block size branch type and predicted branch target address are retrieved from the BTB 114.

Based on the information retrieved at process element 216, the process proceeds to process element 218, where if the branch type is a conditional branch then the process proceeds to process element 220 to determine if the branch is most likely to be taken or not taken. This is predicted based on the branch prediction statistics in the BTB 114. If the branch is taken at process element 220 then the process proceeds to element 222 where the program counter being looked up in the BTB is set equal to the branch target, representing a change in control flow, and then at process element 224 addresses of instructions in a basic block corresponding to the PC that was used to access the BTB in element 210 are placed (enqueued) in the FTQ 130 as a single entry comprising a basic block starting address and a specifying number of instructions in the basic block.

If it is determined at process element 220 that the conditional branch is not taken then the process proceeds to process element 226 where the program counter is incremented to PC=PC+"size", where size is the size of basic block retrieved from BTB in element 216. This increments the PC to a next instruction in a straight line sequence after the not-taken branch at the end of the basic block corresponding to the PC. After incrementing the program counter at process element 226, the process proceeds to element 224 where the basic block corresponding to the PC that was used to access the BTB in element 210 is put into an entry of the FTQ 130 of FIG. 1.

The present technique differs from previously known techniques at least in the inclusion of process element 214, which performs a cache block prefetch and pre-decode to fill the BTB in the event of a BTB miss for a PC corresponding to a start address of a basic block. In previously known systems it would not be possible to distinguish between a genuine BTB miss and encountering a PC for a non-branch instruction. Thus, in the event of no mapping being found in the BTB at process element 212, previously known systems would simply increment the program counter by a default size as if proceeding to a next instruction in a linear sequence of instructions. The ability to discriminate between a BTB miss and a non-branch instruction according to the present technique is efficiently implemented by storage of instructions at the basic block granularity in the BTB 114.

Figure 3:
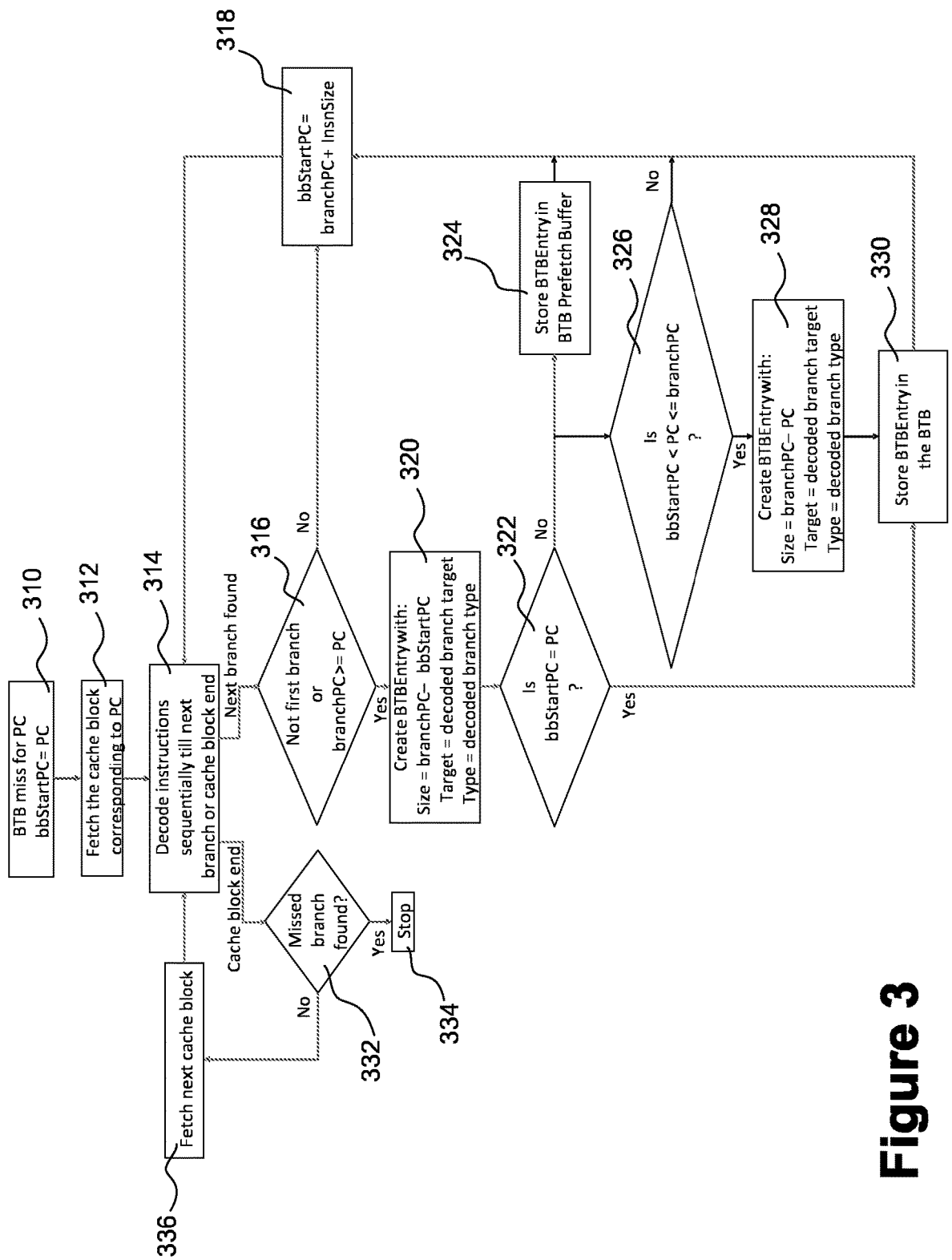
FIG. 3 is a flowchart that schematically illustrates a process for filling a BTB miss in the data processing apparatus of FIG. 1.

FIG. 3 is a flowchart that schematically illustrates a process for filling a genuine BTB miss in the data processing apparatus of FIG. 1. The process begins at process element 310 where a BTB miss is encountered for a PC that is being looked up by the fetch address generator 120 when populating entries of the FTQ 130. When the BTB miss is encountered, a variable denoted "bbstartPC" corresponding to a PC defining the start of a basic block of instructions is initialised to be equal to the PC at which the BTB miss occurred. When the BTB miss is encountered, the fetch address generator 120 may stop filling entries of the FTQ 130 pending resolution of the BTB miss. In this event the entry corresponding to the BTB miss PC is written in the BTB miss buffer 172. Once the BTB miss is resolved, then the entry is written to FTQ. However, in alternative examples, the fetch address generator 120 may either continue to populate FTQ entries of the FTQ 130 until the BTB miss is resolved or may alternatively employ a "throttled" prefetch after encountering a BTB miss such that only a predetermined number, for example two or three, consecutive entries following the entry that gave rise to the BTB miss are prefetched. These are not written into FTQ but directly prefetched into L1-I.

At process element 312 a cache block corresponding to the PC for which the BTB miss was encountered is fetched. The cache block could be fetched from any one of a number of storage locations such as L1-I cache 162, prefetch buffer, LLC or memory. Note that the basic block size is not necessary necessarily the same as the cache block size and that, due to the variability in the size of basic blocks, the basic block could span two or more cache blocks or could alternatively be contained within a single cache block. Next, at process element 314, instructions of the retrieved cache block are decoded sequentially until a branch instruction is found or until the cache block end. Due to the mismatch between the cache block size and the basic block size, and address for the first instruction in the cache block does not necessarily correspond to the PC at which the BTB miss occurs (start address of basic block), so this is taken account of in the process of the flowchart of FIG. 3. At process element 316 if a branch is found within the retrieved cache block and if either: (i) it is not the first branch or (ii) the branch PC is greater than or equal to the PC corresponding to the BTB miss, then the process proceeds to element 320 where a BTB entry is created for the identified branch. The BTB entry is allocated a size corresponding to a difference between the PC of the identified branch and the bbStartPC, which gives the size of the basic block in terms of a number of instructions, assuming a default instruction size. The BTB entry also stores a decoded branch type and a decoded branch target identified via the output of the pre-decoder 180 of FIG. 1. The decoding (i.e. predecoding ahead of the decode pipeline stage) is how the branch type and branch target are identified because these may not be apparent from the un-decoded instructions.

After the BTB entry has been created at process element 320, the process proceeds to element 322 where the bbStartPC is compared with the PC at which the BTB miss occurred. If there is a match at process element 322 then the bbStartPC is known to be a start address for the basic block containing the branch that is being sought to resolve the BTB miss and in this case the process proceeds to process element 330. At process element 330, an entry for the basic block corresponding to the bbStartPC is stored in the BTB. Subsequently, at process element 318, the bbStartPC is incremented to the branch PC plus the default instruction size to give a next instruction to the branch in an in-line sequence and the process proceeds back to process element 314, where more instructions are decoded until the end of the current cache block.

If, on the other hand at process element 322, it is determined that the bbStartPC does not match the PC for which the BTB miss occurred then the process proceeds to process element 324 where the basic block corresponding to the identified branch is stored in the BTB prefetch buffer 116. Entries in the BTB prefetch buffer represent branch instructions whose targets are likely to be required as a result of the change in control flow of instruction execution following a branch being taken as well as for not taken branches.

Process elements 326 and 328 in FIG. 3 represent a special case where basic blocks overlap. For example, a case where a basic block comprises 10 instructions and the $5^{th}$ instruction represents a match for the current PC for which the BTB miss was encountered. In this case the bbStartPC is not equal to the PC, and yet the basic block still comprises a branch instruction suitable for storage in the BTB 114 to resolve the BTB miss. For overlapping basic blocks, it is desirable to store a larger of the two overlapping. If basic blocks. If the condition in block 326 is true then the smaller basic block is also stored. Thus sometimes both basic blocks corresponding to the overlap are stored. If there is not a match between bbStartPC and the current PC at element 322 then the process proceeds to element 326 where it is determined if the PC that "saw" the BTB miss is greater than bbStartPC but is less than or equal to the branchPC (and thus still within the basic block). If these conditions are satisfied then the process proceeds to create a BTB Entry for the basic block at process element 328 and to store the created BTB Entry in the BTB at process element 330. After element 330, the process proceeds to stage 318.

If on the other hand at process element 326, for a PC that is not equal to the bbStartPC, the PC is determined to be either less than bbStartPC or greater than the branch PC then the outcome of the test at element 326 is a "No" decision. This means that the PC does not have a matching branch in the current basic block having start address bbStartPC. In this case, no entry is made in either the BTB buffer 114 or the prefetch buffer 116, but instead the process proceeds to element 318, where the bbStartPC to initiate search of the next basic block and subsequently proceeds to process element 314 to sequentially decode instructions of the next basic block until the cache block end is encountered.

If at process element 314 a current instruction to be decoded corresponds to a cache block end then the process proceeds to process element 332 where it is determined whether or not the missed branch (corresponding to the BTB miss) has been found. If the missed branch has been found during the preceding decoding then the process ends at process element 334. Otherwise, if the missed branch has not been found during decoding of the current cache block then the process proceeds to process element 336 where the next cache block is fetched and subsequently decoded.

Examples of the present technique provide detection of a BTB miss that distinguishes between a BTB lookup of a non-branch instruction and a "genuine" BTB miss involving BTB lookup of a branch instruction for which no entry is currently stored in the BTB, but for which an entry can be written by retrieving the branch instruction from L1 instruction cache, lower level cache or main memory, decoding the retrieved instruction(s) and identifying the missing branch target. The examples specify an architecture for timely delivery of instructions and branch targets in processors without requiring large metadata overheads. The branch prediction and prefetching circuitry according to the present technique may implement:

a fetch-directed instruction cache prefetch a BTB filled by decoding of prefetched cache blocks and requiring little or no extra metadata;

detection of a BTB miss for a branch instruction (as opposed to a non-branch instructions) and triggering a BTB miss probe to be issued to resolve the BTB miss.

The BTB miss probe may be prioritised over the prefetch probe used by the prefetcher to check the L1 cache for the presence of instructions at a prefetch stage and may take a lower priority than a direct fetch being performed by the fetch engine. Populating entries of the FTQ may be stalled when the BTB detects a BTB miss and may be re-started when the BTB miss probe has resolved the BTB miss.

The present technique fills both the L1 instruction cache and the BTB using branch-prediction directed prefetching. This may be contrasted with using a temporal-stream based instruction prefetcher, the use of which can have a high metadata penalty. There was previously a prejudice against using branch-prediction directed prefetching due to the unknown ability of the branch-prediction based prefetcher to cover long lowest-level-cache access delays due to potentially limited accuracy of the branch predictor and the potential need for a very large BTB capacity to capture a branch target working set. However, examples of the present technique have demonstrated that the branch-prediction directed prefetching and BTB miss resolution can be successfully implemented using, for example, a 32 Kilobyte L1 instruction cache, an 8 kilobyte branch predictor and a 2 kilo entriesBTB, each with little or no extra metadata.

Further aspects and features of examples according to the branch prediction based BTB prefilling circuitry according to the present technique are provided in the following text, which includes description of simulation results evaluating the performance of the present technique for executing a number of different program applications and considering a number of alternative control flow delivery mechanisms to the branch-prediction based BTB prefilling according to the present technique. In the description below and in some of the associated Figures, one example implementation of the present technique is denoted "Boomerang" as a label for ease of reference.

Figure 13:
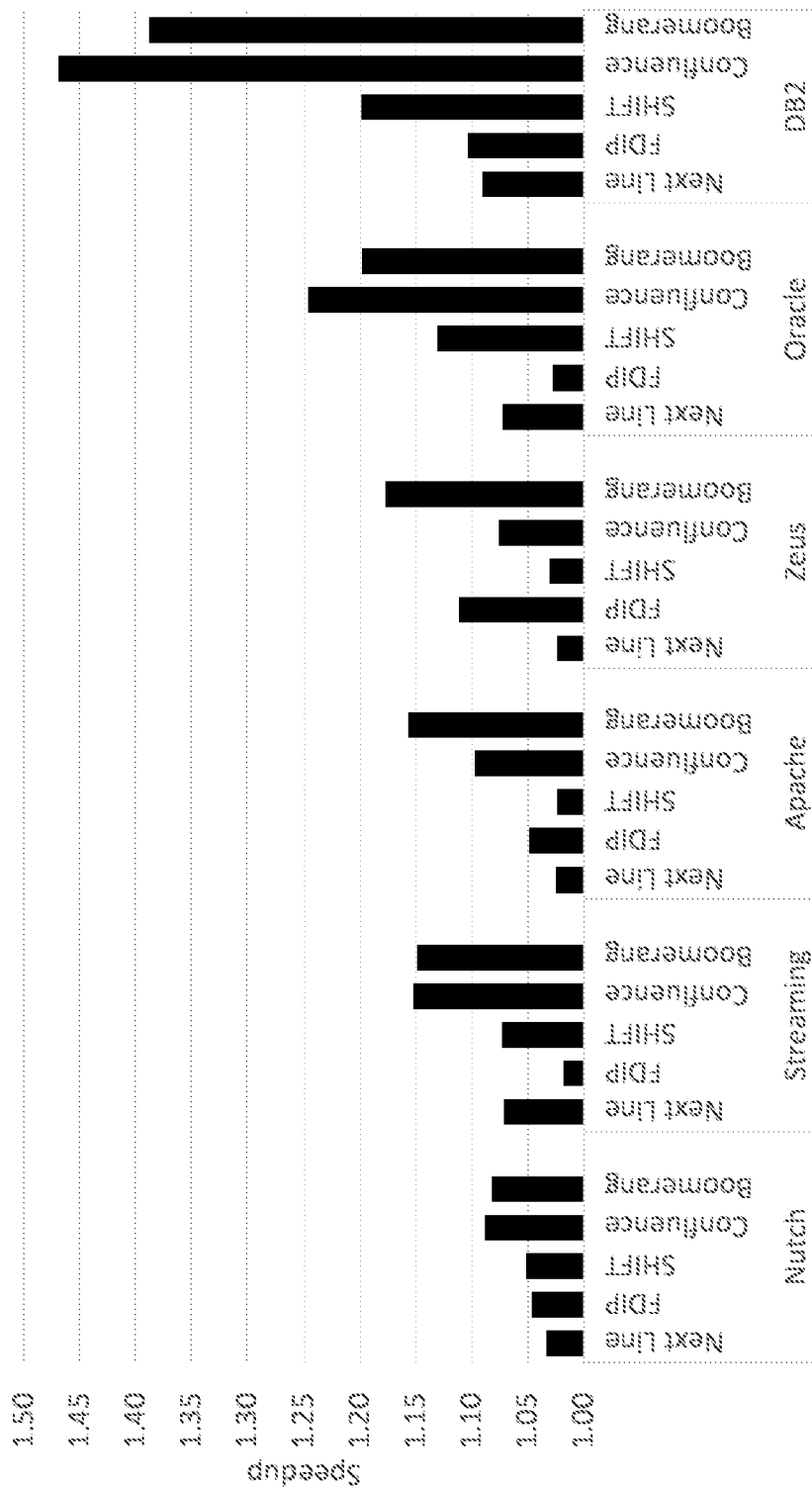
FIG. 13 shows a series of bar charts plotting speed up performance at lower LLC range-trip latency for five different prefetch strategies, including the strategy according to the present technique, and for the six different test program applications.

References are listed together at the end of the description of FIG. 13 after the conclusion for the simulation results and are indicated in square brackets. Boomerang is an example of a metadata-free architecture for control flow delivery.

Contemporary server workloads feature massive instruction footprints stemming from deep, layered software stacks. The active instruction working set of the entire stack can easily reach into megabytes, resulting in frequent front-end stalls due to instruction cache misses and pipeline flushes due to branch target buffer (BTB) misses. While a number of techniques have been proposed to address these problems, they are likely to rely on dedicated metadata structures, translating into significant storage and complexity costs. The branch-prediction based BTB prefilling according to the present technique (e.g. Boomerang) makes it possible to achieve high performance control flow delivery without the metadata costs. Branch-predictor-directed prefetching, which leverage just the branch predictor and BTB to discover and prefetch the missing instruction cache blocks by exploring the program control flow ahead of the core front-end is evaluated to demonstrate viability. Contrary to conventional wisdom, results presented in the Figures described herein confirm for the first time that the approach according to example implementations can be effective in covering instruction cache misses in modern chip multiprocessors with long last level cache (LLC) access latencies and multi-MegaByte server binaries. One contribution lies in explaining the reasons for the efficacy of branch-predictor-directed prefetching. Another contribution is in providing a metadata-free architecture for control flow delivery via the branch-prediction based BTB miss resolution according to the present technique. The present technique leverages a branch-predictor-directed prefetcher to discover and prefill not only the instruction cache blocks, but also missing BTB entries. The simulation results undertaken and described herein demonstrate that the additional hardware cost required to identify and fill BTB misses is small or negligible. The experimental evaluation shows that the present technique matches the performance of the state-of-the-art control flow delivery scheme without the latter's high metadata and complexity overheads.

1. Setting the Scene for Simulation Results

Modern server software stacks are organized as layered services, each implementing complex functionality. Because of this, server workloads tend to have multi-MB instruction footprints that defy private instruction caches, these may cause frequent long-latency accesses to lower cache levels. Similarly, the large number of branches associated with such massive instruction working sets can exceed the capacity of practical single-level BTBs, resulting in either frequent pipeline flushes or making dedicated high-capacity second level BTBs seem appropriate. In the case of both instruction caches and BTBs, frequent misses can considerably degrade core performance by exposing the fill or flush (in the case of a BTB miss) latency and the present technique can ameliorate this in a hardware-efficient manner.

The front-end bottleneck in servers is not a new phenomenon and has been highlighted by a number of studies over the years [ref. 1], [ref. 2], [ref. 3], [ref. 4], [ref. 5], [ref. 6], [ref. 7]. Mitigation techniques for both instruction cache (L1-I) and BTB misses generally rely on sophisticated hardware prefetchers, as software solutions such as code layout optimizations [ref. 8], provide only partial improvements due to complex control flow and massive code footprints in server workloads.

On the instruction cache side, many state-of-the-art prefetchers for servers rely on temporal streaming to record and replay long sequences of instructions [ref. 9], [ref. 10], [ref. 7], [ref. 11]. While potentially effective at eliminating L1-I misses, for maximum or at least good coverage, these techniques require hundreds of kilobytes (KBs) of metadata to store and index the temporal streams. On the BTB side, both spatial and temporal correlating prefetchers have been proposed to move BTB entries from a large second level BTB to a small first level [ref. 12], [ref. 13]. In order to capture the tens of thousands of branch targets that are typical of server workloads, the second-level BTBs are likely to use well over 100 KB of storage.

Whereas the above referenced research papers have looked at the instruction cache problem and the BTB problem separately, more recent research has looked at addressing both together [ref. 14]. Control flow is common across the different structures and dedicated history-based instruction and BTB prefetchers implicitly replicate it in their respective histories. Recognising that instruction cache blocks carry the branch instructions with their targets or offsets, a temporal-stream-based instruction prefetcher was used to fill the BTB by extracting branch information from prefetched cache blocks. The resulting scheme, denoted "Confluence", dispenses with dedicated BTB metadata (i.e, a second BTB level), but still requires expensive metadata for the instruction prefetcher. The present technique implements BTB prefilling using an alternative solution that can reduce the storage requirements associated with the metadata because it does not use temporal-stream based prefetching.

The simulation results obtained explored whether it is possible to achieve high-performance control flow delivery without the metadata costs of prior techniques. There was a motivation to solve both the instruction cache problem and the BTB problem, with no additional metadata beyond what is already contained in a modest-complexity core. The solution according to examples of the present technique may enable high performance control flow delivery in emerging many-core [ref. 15] and many-thread [ref. 16] reduced instruction set (RISC) processors that facilitate silicon efficiency and avoid the use of area-hungry structures in favour of additional cores or threads [ref. 17].

It has been demonstrated by the simulations described herein that branch-predictor-directed prefetching [ref. 18], [ref. 19] can be successfully applied in the server context and used to fill both the instruction cache and the BTB using only the existing structures inside the core, namely the BTB and the branch predictor, thus eliminating or at least reducing the need for additional metadata. The result is not only powerful, but is also contrary to conventional wisdom, since prior work in the server instruction prefetching technical field has held that branch-predictor-directed prefetching suffers from two fundamental drawbacks that limit its usefulness in the server space. Two expected drawbacks were (i) the limited accuracy of the branch predictor that could limit its ability to cover long LLC access delays and (ii) the predicted likely need for massive BTB capacity to capture the branch target working set.

The simulation results described herein demonstrate that both of these perceived issues may be overcome using circuitry modifications (via hardware or software or firmware or a combination thereof) according to the present technique and that branch-predictor-directed prefetching can effectively fill the instruction cache in advance of the core front-end even with large LLC delays. An example implementation of the present technique, "Boomerang" is described, which is a metadata-free control delivery architecture that uses a state-of-the-art branch-predictor-directed prefetcher to fill both the instruction cache and the BTB. Practical issues and optimizations in the design of the Boomerang examples, show that its cost and complexity are favourably low.

An evaluation of Boomerang on a set of traditional and scale-out server workloads in the context of a 16-core RISC processor reveals that Boomerang can eliminates nearly all BTB-related pipeline flushes, and can reduces front-end stall cycles by 50-75%. In doing so, Boomerang can improve performance by 27.5%, on average, over the baseline. Boomerang averages similar performance to an alternative technique (Confluence) without the latter's metadata cost and higher overall complexity.

2. Motivation

2A. Importance of Control Flow Delivery in Servers

Contemporary server workloads can have by massive instruction footprints stemming from deep, layered software stacks. As an example, consider a typical web server deployment, consisting of the web server itself, a caching layer, CGI, a database, and an OS kernel responsible for network I/O and scheduling. The active instruction working set of the entire stack can easily reach into megabytes, resulting in frequent front-end stalls due to instruction cache misses. Similarly, the large code footprint can contain tens of thousands of active branches that can cause pipeline flushes if their targets are not found in a BTB.

The performance degradation caused by massive instruction working sets of commercial and open-source server software stacks has been highlighted by a number of studies over the years [ref. 1], [ref. 5], [ref. 6], [ref. 3]. Moreover, a recent characterization study at Google® suggests that the problem is getting worse [ref. 4]. The authors highlight a search workload with a multi-megabyte instruction working set that has expanded at a rate of 27% per year for several years running, doubling over the course of their study [ref. 4].

Figure 4:
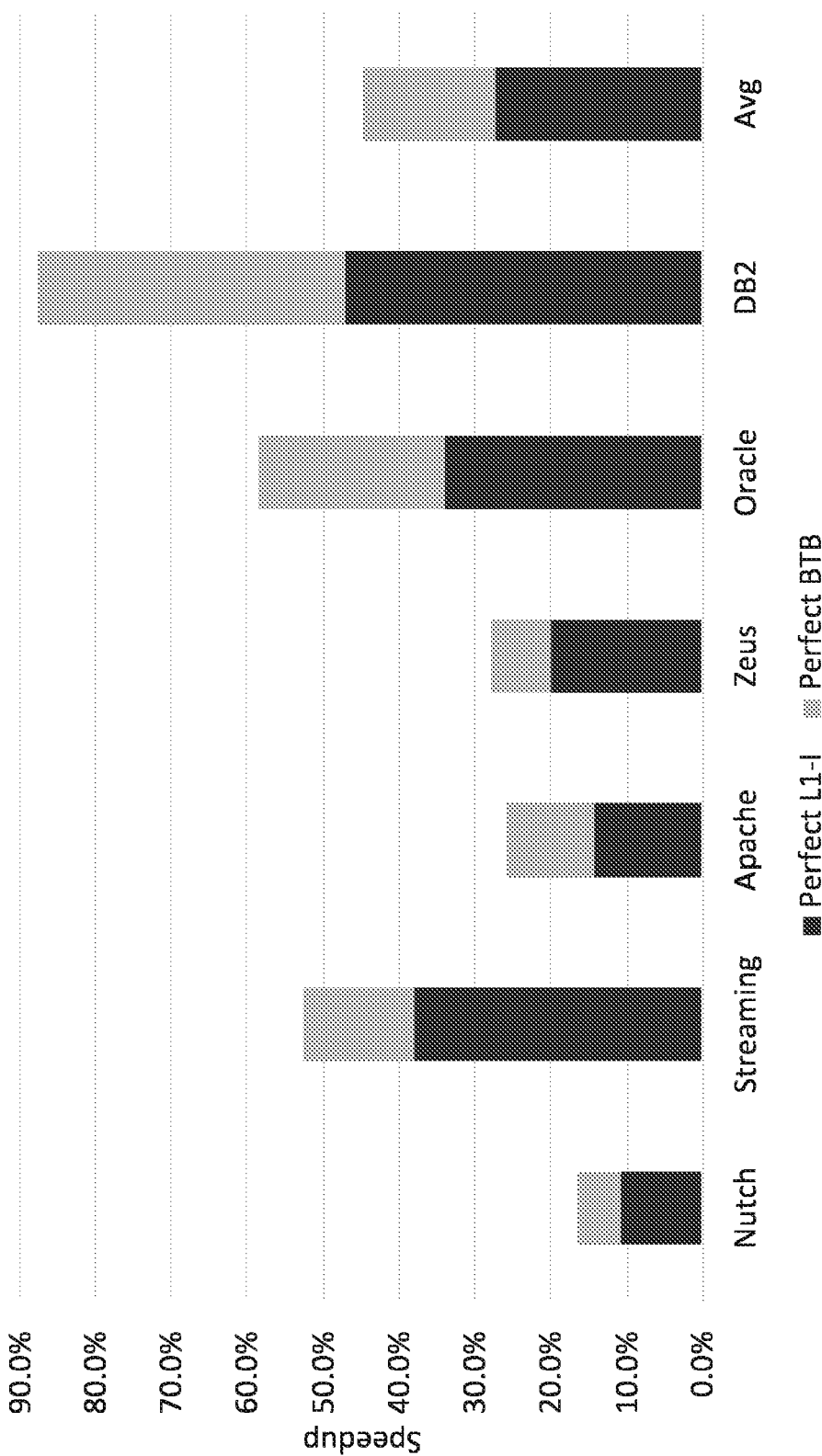
FIG. 4 is a bar chart that schematically illustrates an algorithm speed up that can be achieved for a range of different program applications in the case where L1 instruction cache misses are eliminated (perfect L1-I) and in the case where BTB misses are eliminated (perfect BTB)

To quantify the opportunity in eliminating front-end stalls and pipeline flushes stemming from instruction cache and BTB misses, a set of enterprise and open-source scale-out applications has been studied using a full-system micro-architectural simulator. The baseline core is configured with a 2K-entry BTB and a 32 KB L1-I. Complete workload and simulation parameters can be found below. As FIG. 4 shows, eliminating all L1-I misses improves performance by 11-47%, with another 6-40% performance improvement attained by eliminating all BTB misses.

In the quest for higher core performance, techniques for mitigating instruction cache and BTB misses are examined.

2B. Mitigating Instruction Misses

Spracklen et al.[ref. 20] were the first to provide a detailed micro-architectural analysis of the sources of instruction cache stalls in commercial server workloads. One potential problem identified in the work is that of discontinuities resulting from non-sequential control flow. Such discontinuities challenge next-N-line prefetchers, necessitating control-flow-aware prefetch techniques.

Prior work has proposed using the branch predictor to anticipate future control flow and prefetch cache blocks into the L1-I ahead of the fetch stream [ref. 18], [ref. 19]. One strength of such an approach is its low cost and complexity, since it exploits existing BTB and branch predictor structures. However, branch-predictor-directed prefetch was proposed in the context of SPEC workloads with modest instruction working sets. On the server side, researchers have argued that the vast code footprints of server workloads defy capacities of practical BTBs, rendering branch-predictor-based approaches ineffective due to their inability to discover discontinuities [ref. 20]. Another challenge for branch-predictor-driven approaches is presented by the limited accuracy of branch predictors, which would be expected to handle a difficult task of predicting many branches ahead of the fetch stream to cover large LLC access latencies [ref. 9].

Because of the aforementioned challenges, instruction prefetchers for servers have introduced dedicated prefetcher metadata that is entirely decoupled from branch prediction structures [ref. 20]. State-of-the-art server instruction prefetchers are based on the principle of temporal streaming, whereby entire sequences of instructions are recorded and, subsequently, replayed by the prefetcher to fill the cache ahead of the fetch stream [ref. 9], [ref. 10], [ref. 7], [ref. 11]. While they can be effective at eliminating instruction cache misses, temporal-stream-based prefetchers incur large metadata storage costs due to massive instruction working sets of server workloads and high redundancy across streams. For instance, Proactive Instruction Fetch may use over 200 KB of prefetcher metadata per core [ref. 10].

Recent work has attempted to reduce the storage requirements of temporal streaming. RDIP [ref. 7] correlates a set of targets with an execution context, effectively reducing some of the metadata redundancy. Nonetheless, RDIP still involves using over 60 KB of dedicated metadata storage per core. Another approach, SHIFT, proposes to virtualize the metadata in the LLC and share it across cores executing a common workload [ref. 11]. With an 8 MB LLC, SHIFT requires over 400 KB of metadata storage, which is amortized among the cores executing a common workload. If multiple workloads share a CMP, they each necessitate their own prefetch metadata, placing additional pressure on the LLC.

To summarize, previously known instruction prefetchers for servers are effective but, despite recent efforts to make them practical, often incur significant costs associated with storing and managing the metadata.

2C. Mitigating BTB Misses

Providing the instruction cache with correct blocks is only part of the challenge; the other part is feeding the core with the right sequence of instructions. To do so, modern processors employ conditional branch predictors and branch target buffers to predict discontinuities and redirect the fetch stream to the target address.

The large instruction footprints in server workloads can place significant pressure on the BTBs, which requires multiple bytes per entry to precisely identify branch PCs and their targets. In contrast, branch direction predictors can mandate only a small amount of state per branch and can often deal with aliasing. As a result, recent work has shown that minimizing mis-speculation-induced flushes can involve maintaining 16-32K BTB entries, costing up to 280 KB of state per core [ref. 14].

Several approaches have suggested augmenting a low-latency first-level BTB with a large-capacity second level BTB and a dedicated BTB transfer engine for moving entries between BTB levels. One such approach, called Bulk Preload and implemented in an IBM z-series processor, relies on a 24K-entry second-level BTB and uses spatial correlation to preload a set of spatially-proximate entries into the first level upon a miss there [ref. 12]. Another approach, "Phantom BTB", forms temporal streams of BTB entries and virtualizes them into the LLC [ref. 13]. Both designs incur high storage overhead (in excess of 200 KB per core) and rely on misses in the first-level BTB to trigger fills, thus exposing the core to the high access latency of the second BTB level.

Recent work has suggested an effective way to mitigate the cost and performance overheads of hierarchical BTBs. Noting that instruction cache blocks effectively embed the BTB metadata for the branches they contain, "Confluence" proposes using a temporal-stream-based instruction prefetcher to fill both the instruction cache and the BTB, the latter by predecoding incoming cache blocks and extracting branch targets from branch instructions inside the cache block [ref. 14]. By avoiding the need for a dedicated second BTB level and a dedicated BTB prefetcher, Confluence can perhaps reduce the cost of a high-performance front-end. However, it still relies on a temporal-stream-based instruction prefetcher that itself incurs high metadata costs.

3. Toward Metadata-Free Control Flow Delivery

Reducing metadata costs is potentially useful for emerging many-core and many-thread server processors, such as Cavium Thunder-X [ref. 15] and Oracle T-Series [ref. 16], that seek to maximize or at least increase the number of hardware contexts on chip, thus delivering better performance per unit area and per watt over conventional server CPUs [ref. 17]. To maximize or improve these metrics, many-core and many-thread server processors eschew high microarchitectural complexity, including massive BTBs and vast metadata stores, while still relying on out-of-order cores to meet stringent per-thread performance requirements of online services.

To provide effective control flow delivery in such designs, branch predictor-directed prefetching [ref. 19] is used, as it does not require any metadata beyond what is already present in a core—a single-level BTB and a branch predictor. However, as noted above, prior work on server instruction prefetching has dismissed branch predictor-directed prefetching on the basis of two concerns:

i) The branch predictor is expected to predict a large number of branches correctly in order to run far enough ahead of the core front-end so as to cover the large LLC delays in many-core NUCA processors [ref. 9]. Because branch predictor accuracy decreases geometrically with the number of branches predicted, covering large LLC delays while staying on the correct path is infeasible.

ii) The BTB is expected to capture a large branch target footprint to discover discontinuities [ref. 20]. With a small BTB, frequent BTB misses will lower prefetch coverage and cause frequent pipeline flushes, preventing the branch predictor from running ahead of the core front-end.

3A. Does Branch Prediction Accuracy Limit Coverage?

In order to understand to what extent the branch predictor affects prefetch coverage, we assess the benchmarks from FIG. 4 with a state-of-the-art TAGE branch predictor [ref. 21] and FDIP [ref. 19] as branch-predictor-directed prefetcher. FDIP decouples the L1-I from the front-end via a deep fetch target queue (FTQ), and uses the BTB and branch predictor ensemble to fill it. To isolate the effect of the branch predictor, a near-ideal 32K-entry BTB is used. Detailed microarchitectural parameters can be found in Section 5.

Figure 5:
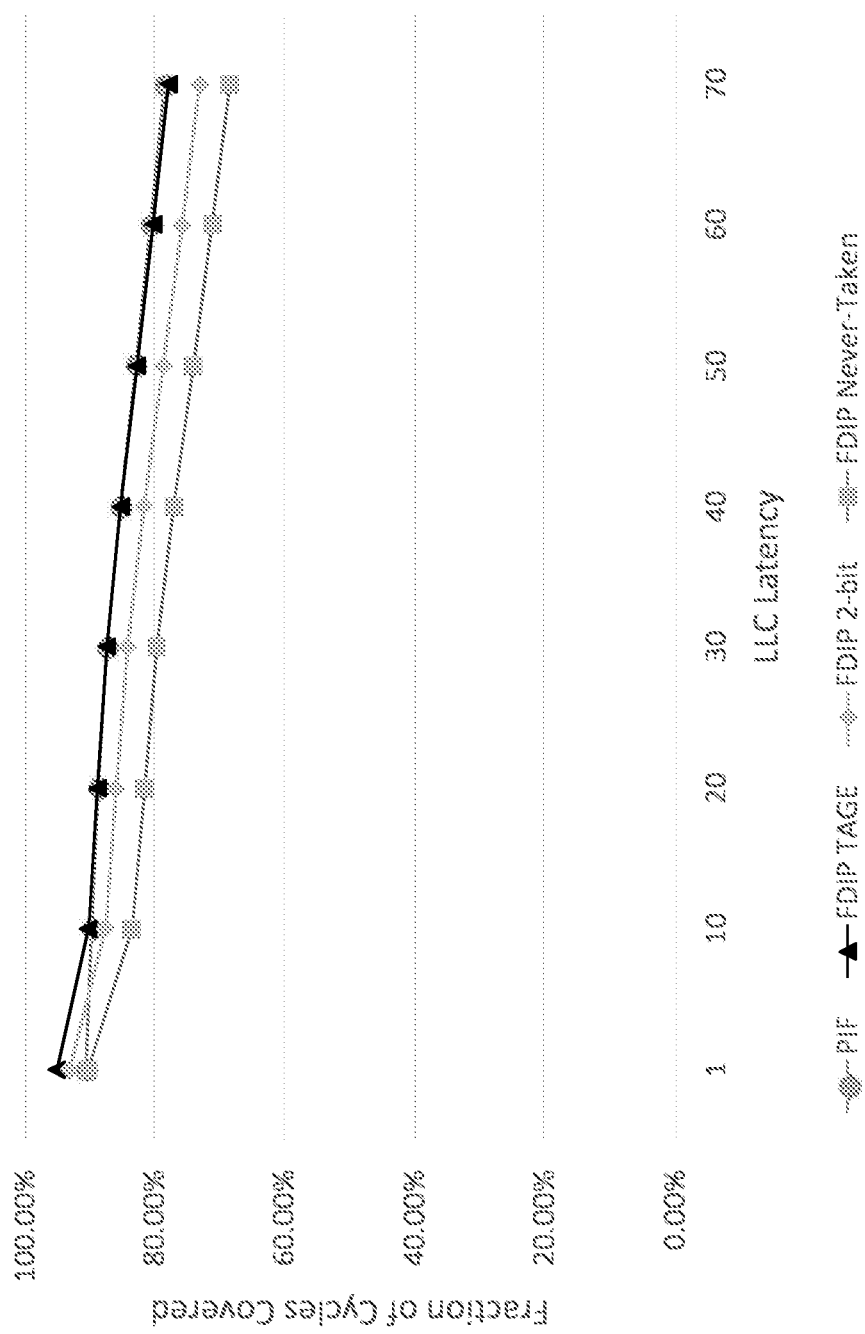
FIG. 5 is a graph of a fraction of cycles covered against lower level cache latency which compares four different branch prediction strategies.

FIG. 5 compares a TAGE-based FDIP prefetcher to PIF [ref. 10], a state-of-the-art temporal streaming instruction prefetcher with private metadata. We study a range of LLC access latencies and use percentage of front-end stall cycles covered as a metric of choice. A stall cycles covered metric is used over the more common misses covered metric to precisely capture impact of in-flight prefetches—the ones which have been issued but the requested block has not arrived to L1-I when needed by the fetch unit. The metric captures stall cycles only on the correct execution path, since wrong-path stalls do not affect performance.

As shown in the FIG. 5, FDIP with TAGE performs nearly identically to PIF over a range of LLC access latencies. For very small LLC access latencies, PIF's coverage actually lags behind that of FDIP because PIF monitors the retire stream to advance the prefetcher. As a result, PIF is exposed to the pipeline latency upon a branch mispredict; in contrast, FDIP immediately redirects the prefetcher to the correct path.

Figure 6:
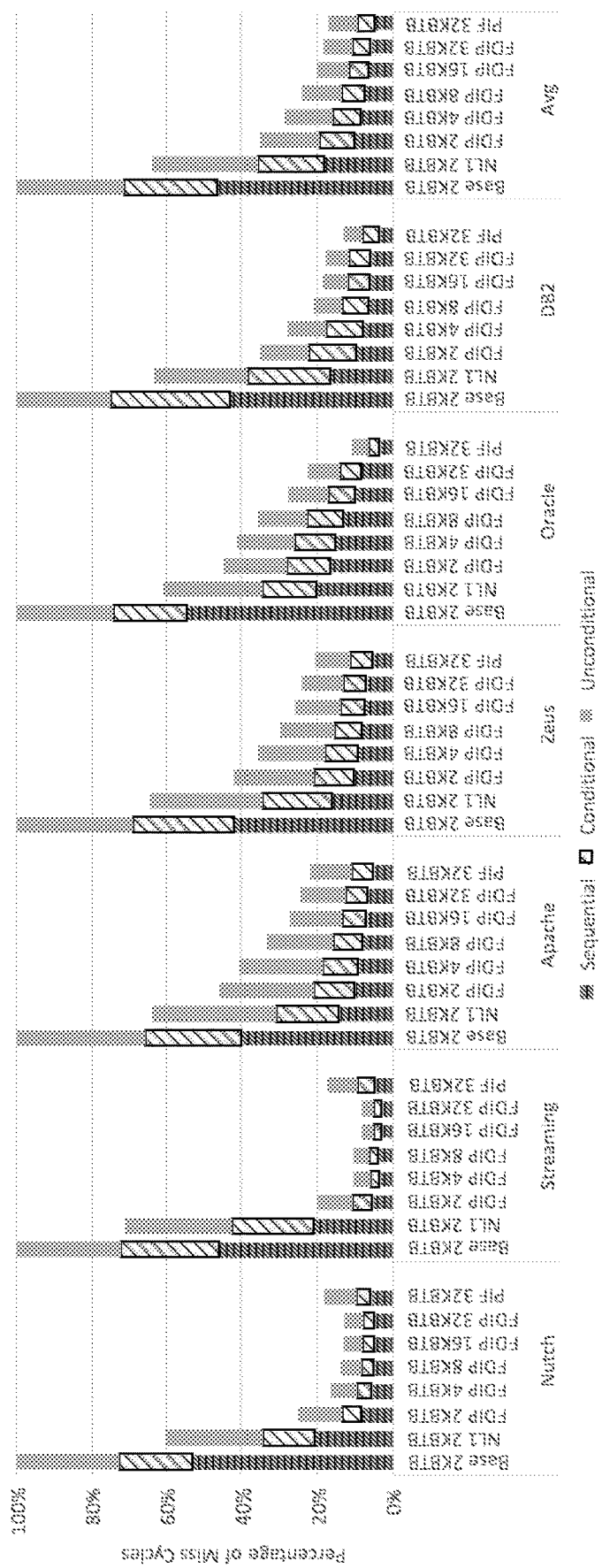
FIG. 6 schematically illustrates simulation results comprising bar charts of a percentage of miss cycles for each of its different prefetching strategies, including a fetch directed instruction prefetch strategy and a temporal streaming strategy, and plots results for six different program applications.

To better understand the result, the breakdown of sources of miss cycles for various prefetchers is plotted, normalized to a no-prefetch baseline in FIG. 6. A 16-core Non-Uniform Cache Access (NUCA) processor with a mesh-based interconnect has been modelled, yielding an average LLC access latency of 30 cycles. In the FIG. 5, three prefetcher configurations are considered: next line (NL), FDIP 32K, and PIF 32K. The sources of misses are broken down into three categories: (i) sequential, (ii) discontinuities due to conditional branches, and (iii) discontinuities due to unconditional branches, which include function calls and returns.

The results show that sequential misses dominate, accounting for 40-54% of all miss cycles in the no-prefetch baseline. This explains why simple next-N-line prefetchers can be effective, as also observed in prior work on server instruction cache prefetching [ref. 20]. FDIP 32K covers the majority of cache misses across all three categories, delivering essentially identical coverage as PIF within each category.

Figure 7:
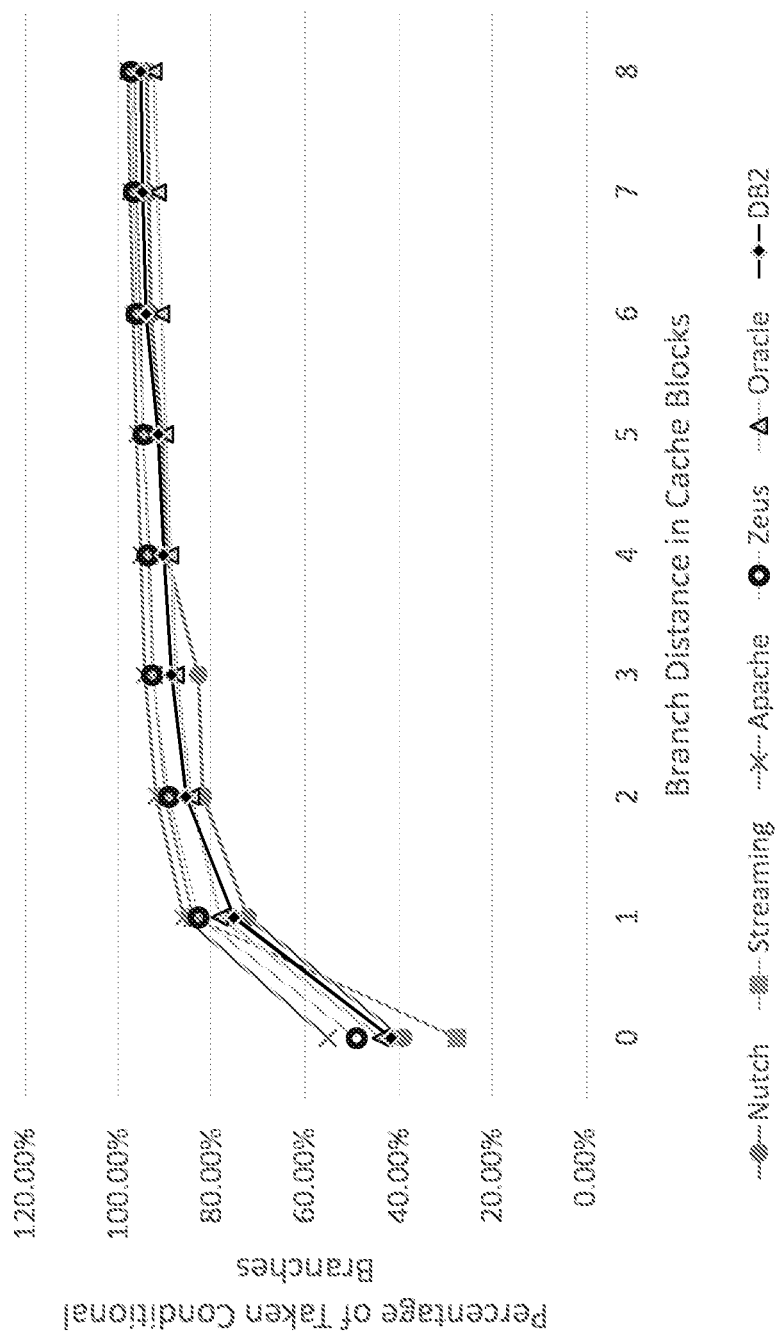
FIG. 7 is a graph showing simulation results of percentage of taken conditional branches plotted against branch distance in cash block blocks for each of the six different test program applications.

While the TAGE branch predictor is quite accurate, it is could be improved upon. So how does FDIP attain such high coverage across a large LLC latency range despite the mispredicts? The answer lies in the fact that most Taken conditional branches have targets within a few cache lines of the branch instruction. As FIG. 7 shows, nearly 92% of all taken branches have targets within four blocks of the current one. Because of the short offset, correctly predicting these branches is not essential for high coverage of conditional discontinuities. For such short backward branches, the targets are typically already found in the cache, while for forward branches, a prefetcher running far enough ahead will reach the cache block containing the target of the branch by simply following the fall-through path.

With sequential and conditional branches largely covered, the unconditional branches are the remaining source of discontinuities. The targets of these branches tend to be far away from the branch instruction itself, which is why next-N-line prefetchers generally fail to provide any coverage in this category. However, because these branches are unconditional, following them in FDIP does not depend on branch predictor's accuracy, thus allowing high coverage for these discontinuities regardless of the branch predictor.

To confirm this intuition, we have paired FDIP with a naive "never-taken" predictor that, for each conditional branch, simply follows the fall through path. We have also evaluated FDIP with a simple bimodal predictor. To focus the study on the effects of branch predictor on FDIP, these two predictors have been used only to drive FDIP; the back-end is still using TAGE to guarantee that pipeline resets due to branch mispredicts are identical to the baseline FDIP+TAGE configuration.

FIG. 5 shows the results of the study. As expected, FDIP with the "never taken" predictor attains much of the coverage benefit of FDIP with TAGE. In other words, while a good branch predictor is desirable to avoid pipeline squashes, even a naive branch predictor coupled with FDIP can be surprisingly effective in covering discontinuities.

3B. Does BTB Size Limit Coverage?

We next consider the BTB as a potential bottleneck. A small BTB may limit coverage by failing to discover discontinuities and by causing pipeline flushes due to branch mispredicts, thus preventing the branch predictor from running sufficiently far ahead of the core front-end.

Figure 8:
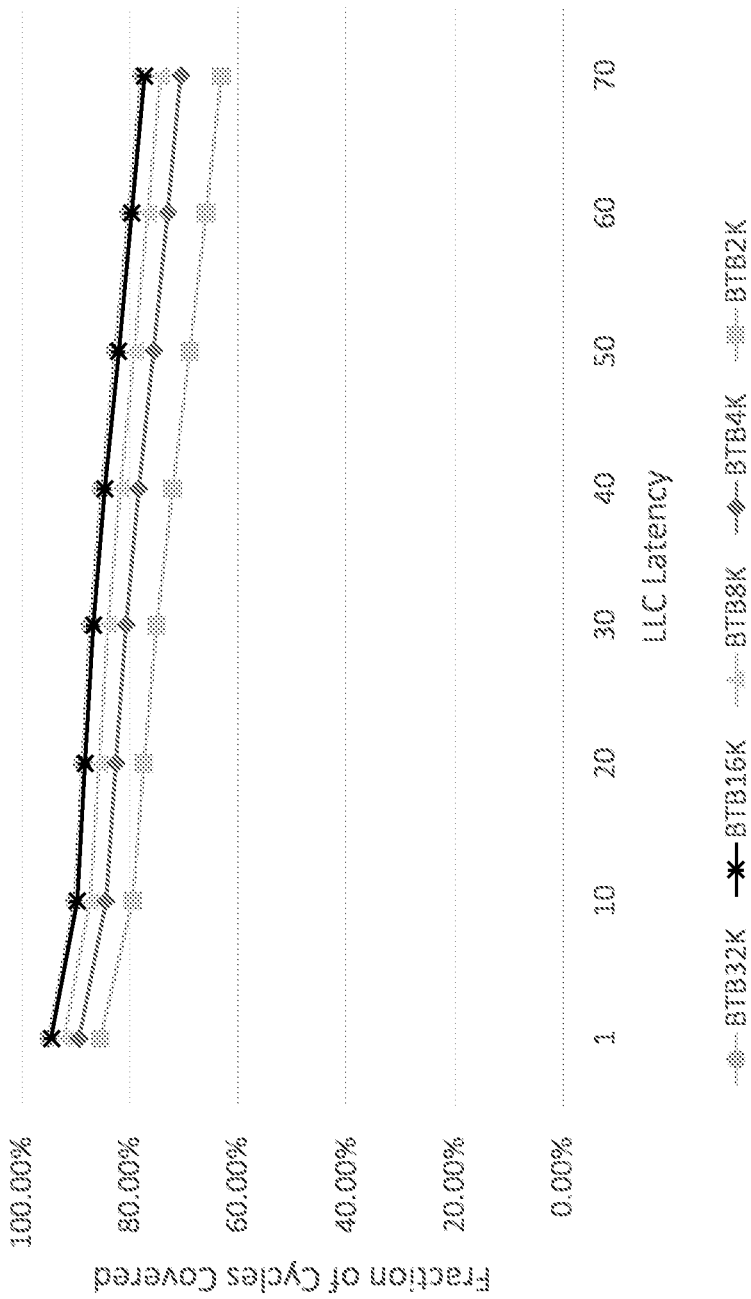
FIG. 8 is a graph showing simulation results comprising a percentage of front-end stall cycles covered against LLC latency for five different BTB sizes.

FIG. 8 shows FDIP's stall cycle coverage as a function of the BTB size and the LLC access latency. The same set of workloads is used as before and FDIP is paired with the TAGE branch predictor. As the FIG. 8 shows, going from a 32K to 2K BTB results in a 12% drop in stall cycle coverage. The reduction is relatively modest, and can be explained by the insight in Section 3.A above that most misses are due to a combination of sequential and conditional branches, and these can be covered by following the straight-line path.

Thus, the difference in coverage between a large and small BTB may be attributed to unconditional branches. Because the targets of unconditional branches tend to reside far from their branch instructions, a BTB can be used to uncover these discontinuities.

To validate the intuition, FIG. 8 is revisited, this time focusing on the three FDIP configurations featuring 2K-, 8K-, and 32K-entry BTB. As expected, the largest difference in stall cycle coverage between a 2K- and 32K-entry BTB is found to be due to unconditional branches. For instance, on Nutch, the 32K-entry BTB FDIP configuration improves coverage over the 2K-entry BTB by 3.4%, 2% and 7% for sequential, conditional and unconditional branches, respectively.

3C. The Big Picture

As discussed in Section 2 above, there are two major bottlenecks in the control flow delivery for server workloads that led to the rise of storage intensive prefetchers: L1-I misses and BTB misses. It is desirable to not only mitigate both of these bottlenecks, but to do so while avoiding the high metadata costs and complexity overheads incurred by prior techniques.

It has been demonstrated via the simulation results described above that a branch-predictor-directed prefetcher can replace the storage intensive state-of-the-art instruction prefetchers without compromising on L1-I miss coverage. The branch-predictor-directed prefetching is effective because the branch prediction accuracy is not a concern as was the previous expectation, since a branch predictor may be used for conditional branches only and those tend to have short target offsets. Thus, branch mispredictions have little or no effect on L1-I miss coverage. Large BTBs may be useful in discovering unconditional discontinuities, which account for only 16%, on average, of front-end stall cycles in a FDIP-enabled system with a 2K-entry BTB.

While a branch-predictor-directed prefetcher is effective in mitigating L1-I miss stalls, it does not tackle the BTB miss problem in previously known systems. As the FIG. 4 study shows, eliminating these misses can lead to a performance improvement of up to 40%. This can be done without incurring 100s of KB of storage overhead, as would be the case with previous approaches.

Boomerang is a metadata-free control flow delivery architecture that augments a conventional branch-predictor-directed front end to identify and resolve BTB misses, in addition to instruction cache misses. Boomerang and other examples according to the present technique can avoid large storage overheads. In doing so, Boomerang can eliminate or at least reduce the front-end stalls associated with L1-I misses and the pipeline flushes caused by the BTB misses.

4. Boomerang Example

Boomerang and other examples of the present technique may provide a unified solution to the L1-I and BTB miss problems while relying exclusively on the existing in-core metadata. For mitigating instruction cache misses, Boomerang leverages an existing branch-predictor-directed prefetcher, FDIP [ref. 19]. For resolving BTB misses, Boomerang exploits an insight that the BTB can be populated by extracting branches and their targets from incoming cache blocks [ref. 14]. Boomerang, unlike known alternative processing systems, discovers and fills BTB misses using existing in-core structures and small augmentations to the FDIP prefetcher.

FIG. 1 (described above) schematically illustrates the microarchitecture of Boomerang. As Boomerang builds upon FDIP, a baseline FDIP microarchitecture is outlined. Next, additional components implemented to detect and prefill the BTB misses are described. Finally, trade-offs and optimizations in the Boomerang microarchitecture are considered.

4A. Baseline: FDIP

FDIP employs a decoupled front-end where the fetch engine is decoupled from the branch prediction unit (consisting of the branch predictor, BTB and return address stack) by means of a deep fetch target queue (FTQ). Each FTQ entry holds fetch address information for a basic block which is defined as a sequence of straight-line instructions ending with a branch instruction. The branch prediction unit makes a basic block prediction every cycle and pushes it to the FTQ. The fetch engine reads the head of FTQ and issues N demand-fetch requests to L1-I, where N is the fetch width. A typical in-order fetch engine waits for a response from L1-I, before issuing subsequent requests. Therefore, in case of an L1-I miss, the fetch engine may stall until the instructions are returned from the lower cache levels.

The prefetch engine is a component of FDIP that is responsible for prefetch address generation. As new basic block fetch addresses are inserted into the FTQ, the prefetch engine scans them to discover the L1-I blocks that will be accessed by the fetch engine in the near future. For every new L1-I block discovered, the prefetch engine sends a prefetch probe to the L1-I. The prefetch probe checks if the block is present in L1-I or in the prefetch buffer. If the block is already present, no further action is taken. However, if the probed block is missing, it is fetched from the lower levels of caches and is inserted into the L1-I's prefetch buffer. A subsequent demand-fetch hit in the prefetch buffer moves the block to L1-I.

Unlike the fetch engine, the prefetch engine does not require a response from the L1-I; therefore, it can sustain a high issue rate for prefetch probes, even if the probes miss in the L1-I. This attribute may allow the prefetch engine to run far ahead of the fetch engine. Moreover, as the prefetch engine operates at a cache block granularity, it issues only a single prefetch probe for all the basic blocks residing in that cache block. This allows the prefetch engine to further race ahead of the fetch stream. As long as the prefetch engine is sufficiently ahead of the fetch engine, it can hide all of the L1-I misses through timely prefetching.

4B. Boomerang Overview

While FDIP is effective in solving the front-end (frequent L1-I misses) problem, the overall performance may still suffer because of pipeline flushes due to frequent BTB misses for eventually taken branches. Boomerang and other examples according to the present technique go a step ahead of FDIP and prefill not only the missing L1-I blocks but also the missing BTB entries. By prefilling the BTB, it reduces the number of pipeline flushes and hence unblocks both front-end and back-end bottlenecks.

In order to fill the BTB, Boomerang circuitry first needs to detect that a BTB miss has occurred. A conventional instruction-based BTB interprets all BTB lookups that miss in the BTB as non-branch instruction(s). In other words, previously known BTB design cannot distinguish between a non-branch instruction and a genuine BTB miss. Therefore, Boomerang leverages a different BTB organization—a basic-block-based BTB [ref. 22], which stores BTB entries at basic block granularity. Basic blocks have previously been used in a different context for a different purpose. This basic-block based BTB guarantees that each BTB entry contains exactly one branch, whose target is another BTB entry. Therefore, if a BTB lookup fails to return a valid entry, it is guaranteed or at least highly likely to be a genuine BTB miss.

Upon detecting a BTB miss, because the target and the basic block size of the missing entry may not be known, the branch prediction unit stops feeding the FTQ with new entries until the BTB miss is resolved. The following actions are then executed to resolve the BTB miss:
i) A BTB miss probe for the cache block containing the starting address of the missing BTB entry is issued to the L1-I.
ii) The corresponding cache block is fetched from L1-I or from the lower cache levels if not present in L1-I.
iii) The cache block is sent to a predecoder that extracts all the branches and their targets.
   a) If branches are found after the starting address of missing BTB entry: the first such branch is the terminating branch of the missing BTB entry. A new BTB entry is created and stored in BTB.
   b) If no branch is found after the starting address of missing BTB entry: a BTB miss probe for the next sequential cache block is issued and the process above repeats starting from step ii).

Furthermore, the BTB entries corresponding to the branches inside the predecoded cache block(s), except for the branch terminating the missing BTB entry, may be stored in the BTB prefetch buffer. Whenever the BTB is accessed, the BTB prefetch buffer is accessed in parallel. On a hit to the BTB prefetch buffer, the corresponding entry is moved to the BTB. The remaining entries are replaced in a first-in-first-out manner.

Once the BTB miss is resolved, the branch prediction unit may, in some examples, resume its normal operation of feeding the FTQ.

4C. Boomerang: Details

1) Prefetching Under a BTB Miss

As described above, Boomerang in some examples stops filling the FTQ on discovering a BTB miss, thereby potentially losing prefetch opportunities if the branch turns out to be not taken. In this section, we discuss the alternative design choices that can be opted for on a BTB miss, which are alternative examples according to the present technique.

No Prefetch: As described in the previous section, the simplest design choice is to stop feeding the FTQ once the branch prediction unit detects a BTB miss. However, this approach may result in missed prefetching opportunities and a loss of coverage if the branch is not-taken after the BTB miss resolution.

Unthrottled prefetching: In unthrottled example implementations of the Boomerang circuitry, the branch prediction unit speculatively assumes that the branch corresponding to the missing BTB entry is not going to be taken and continues to feed the FTQ sequentially until the next BTB hit. However, such unthrottled prefetching can potentially pollute the L1-I prefetch buffer by over-prefetching on the wrong path. Moreover, wrong-path prefetching wastes bandwidth at the LLC and in the on-chip interconnect, which can cause a degradation in processor performance.

Throttled prefetch: Throttled example implementations of the Boomerang circuitry provide a balance between the lost opportunities in not prefetching on a BTB miss and potentially over-prefetching in Unthrottled prefetch. To capture the opportunity for sequential prefetching under a BTB miss, Throttled prefetch issues a prefetching request for next N sequential cache blocks if the BTB miss cannot be filled from the L1-I.

Therefore, if the branch is not-taken following BTB miss resolution, prefetching opportunity is not lost due to next-N-block prefetching. On the other hand, if the branch is taken, the number of uselessly prefetched cache blocks is limited to just the next-N.

Simulation results described herein found that Throttled Prefetch using the next-2-blocks policy outperforms other policies. A study showing the trade-offs of the design space is presented in Section 6.E1 below.

2) BTB Miss Probe Prioritization

Because a BTB miss in some examples causes the branch prediction unit to stop feeding the FTQ, it also, for these examples, stops L1-I prefetching once the prefetch probes for the pending FTQ entries have all been issued. However, if the BTB miss can be resolved before all the prefetch probes have been sent, the branch prediction unit can again start feeding the FTQ and prefetching can continue uninterrupted. Thus, it is best to resolve the BTB misses as early as possible.

To ensure swift resolution of BTB misses, Boomerang prioritizes BTB miss probes over pending prefetch requests. As shown in FIG. 1, the L1-I request priority multiplexer 150 steers a BTB miss probe to L1-I before any prefetch probe generated by the prefetch engine. This prioritization facilitates a fast resolution of BTB misses and reduces the likelihood of stalling L1-I prefetching.

5. Methodology

TABLE 1

| Workloads | |
|---|---|
| Web Search | |
| Nutch | Apache Nutch v1.2 |
| | 230 clients, 1.4 GB index, 15 GB data segment |
| Media Streaming | |
| Darwin | Darwin Streaming Server 6.0.3 |
| | 7500 clients, 60 GB dataset, high bitrate |
| Web Frontend (SPECweb99) | |
| Apache | Apache HTTP Server v2.0 |
| | 16K connections, fastCGI, worker threading model |
| Zeus | Zeus Web Server |
| | 16K connections, fastCGI |
| OLTP-Online Transaction Processing (TPC-C) | |
| Oracle | Oracle 10 g Enterprise Database Server |
| | 100 warehouses (10 GB), 1.4 GB SGA |
| DB2 | IBM DB2 v8 ESE Database Server |
| | 100 warehouses (10 GB), 2 GB buffer pool |

TABLE 2

| Microarchitectural parameters | |
|---|---|
| Processor | 16-core, 2 GHz, 3-way OoO |
| | 128 ROB, 32 LSQ |
| Branch Predictor | TAGE [22] (8 KB storage budget) |
| Branch Target Buffer | 2K-entry |
| L1 I/D | 32 KB/2 way, 1-cycle, private |
| | 64-entry prefetch buffer |
| L2 NUCA cache | shared, 512 KB per core, 16-way, 5-cycle |
| interconnect | 4 × 4 2D mesh, 3 cycles/hop |
| Memory latency | 45 ns |

Boomerang has been evaluated on a set of enterprise and open-source scale-out applications listed in Table 1 using Flexus [ref. 23], a full system multiprocessor simulator. Flexus, which models SPARC v9 ISA, extends the Simics functional simulator with out-of-order (OoO) cores, memory hierarchy, and on-chip interconnect. We use SMARTS [ref. 24] multiprocessor sampling methodology for sampled execution. Samples are drawn over 32 billion instructions (2 billion per core) for each application. At each sampling point, we start cycle accurate simulation from checkpoints that include full architectural and partial micro-architectural state consisting of caches, BTB, branch predictor, and prefetch history tables. We warm-up the system for 100K cycles and collects statistics over the next 50K cycles. We use ratio of the number of application instructions to the total number of cycles (including the cycles spent executing operating system core) to measure performance. This metric has been shown to be an accurate measure of server throughput [ref. 23]. The performance is measured with an average error of less than 2% at a 95% confidence level. Our modelled processor is a 16-core tiled CMP. Each core is three-way OoO resembling an ARM Cortex-A57 core. The microarchitectural parameters are listed in Table 2. We model a 2K-entry BTB, which is a practical size for a single-cycle access latency.

5A. Control Flow Delivery Mechanisms

The efficacy and storage overhead of the following state-of-the-art control flow delivery mechanisms is compared.

Discontinuity Prefetcher (DIP): DIP records the control flow discontinuities that result in L1-I misses in a discontinuity prediction table. For maximum L1-I miss coverage, the table needs to store up to 8K entries. Spracklen et al. [ref. 20] proposed to complement DIP with a Next-4-Line prefetcher to cover the sequential misses. It was found that Next-2-Line prefetcher works better than Next-4-Line due to higher prefetch accuracy in our settings. Therefore, a Next-2-Line prefetcher is used along with an 8K entry discontinuity prediction table.

Fetch Directed Instruction Prefetch (FDIP): As described in Section 4.A above, FDIP decouples the branch prediction unit from the fetch engine by means of a fetch target queue (FTQ). The instruction prefetches are issued from the FTQ entries. A 32-entry FTQ is modelled with each entry holding the start address of a basic block and its size. A basic block-oriented BTB is used to drive FDIP. On a BTB miss, FDIP enqueues a single sequential instruction address into the FTQ per cycle and access the BTB with the sequential address until the next BTB hit.

Shared History Instruction Prefetch (SHIFT): SHIFT is a temporal-stream-based instruction prefetcher that records the correct-path instruction history and replays it to predict future instruction accesses [ref. 11]. SHIFT virtualizes the instruction history metadata into the LLC and shares it among all cores executing a common workload. For high L1-I miss coverage, SHIFT requires at least a 32K-entry instruction history and an 8K-entry index table.

Confluence: Confluence, the alternative system to the present technique (Boomerang examples) described herein that tackles both L1-I and BTB misses, relies on SHIFT for instruction prefetching. Confluence predecodes the prefetched L1-I blocks, identifies branch instructions, and inserts them into the BTB. We model Confluence as SHIFT augmented with a 16K-entry BTB, which provides a generous upper bound on Confluence's performance [ref. 14]. Our storage calculation assumes a 1K-entry block-oriented BTB per the original Confluence design.

Boomerang: As described in Section 4 above, Boomerang employs FDIP for L1-I prefetching and augments it with BTB prefilling. Like FDIP, Boomerang employs a 32-entry FTQ. Furthermore, Boomerang uses a throttled prefetch approach that prefetches the next-2 sequential cache blocks on a BTB miss that is not filled from the L1-I. Also, our evaluated Boomerang design employs a 32-entry BTB prefetch buffer.

6. Evaluation

In this section, a first evaluation is performed of how effective Boomerang is in delivering control flow, i.e. reducing pipeline squashes and front-end stall cycles, compared to other alternatives. Second, the performance benefits attained owing to Boomerang's control flow delivery are evaluated. Third, we compare the storage cost of Boomerang with other control flow delivery mechanisms. Then, we assess the efficacy of throttled (next-N-block) prefetching and finally, evaluate Boomerang's sensitivity to LLC latency.

6A. Branch Misprediction Squashes

Figure 9:
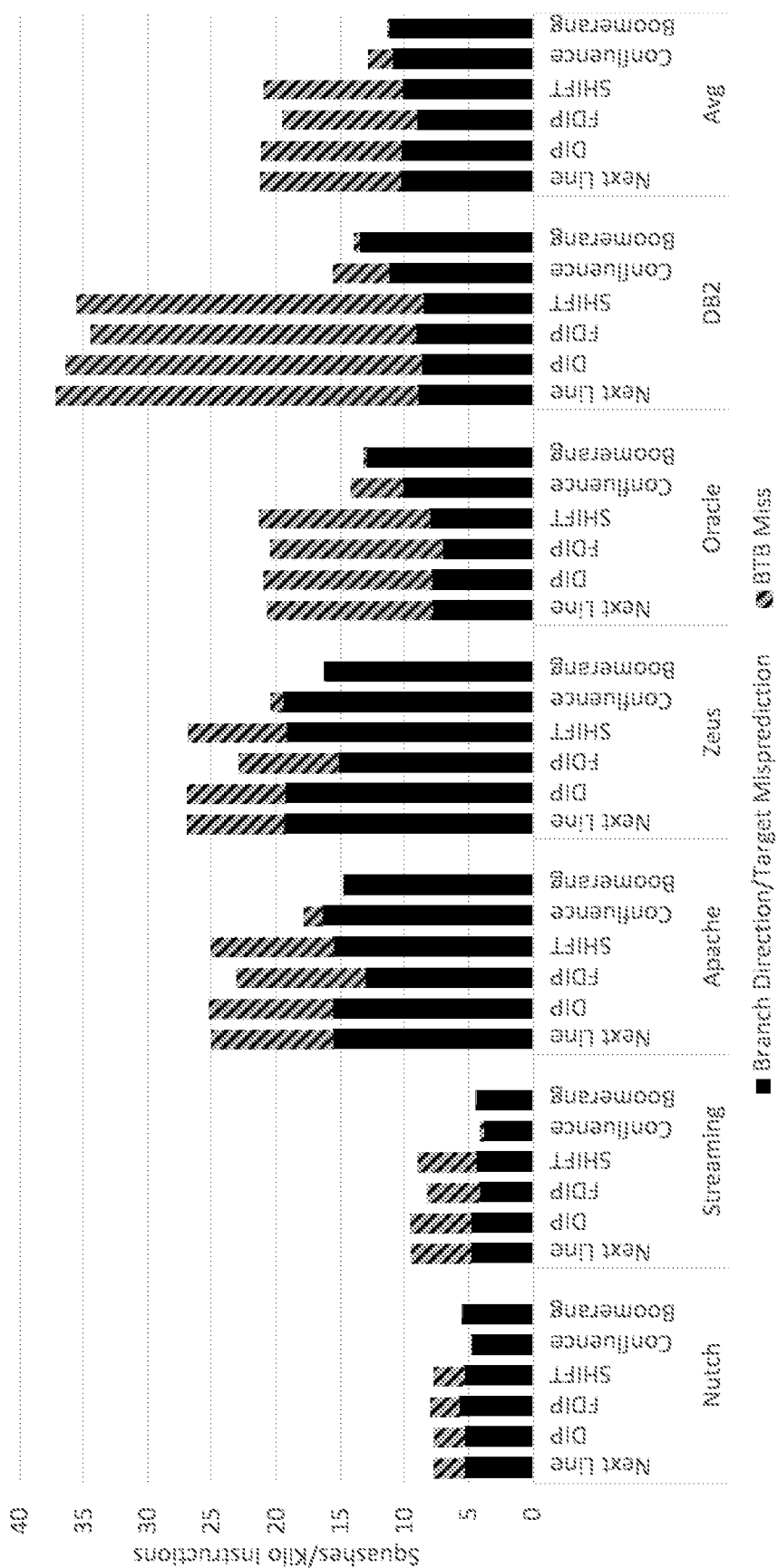
FIG. 9 shows bar charts of a number of pipeline squashes are thousand instructions with a 2 kB entry BTB for each of the six different test program applications and six different prefetch strategies.

The BTB misses and branch direction/target mispredictions are the two major sources of pipeline squashes. FIG. 9 shows the number of pipeline squashes per 1K instructions coming from these two sources for different prefetching schemes. On average, both BTB misses and branch mispredictions are equally responsible for pipeline squashes as can be seen for prefetching schemes that don't target reducing BTB misses, i.e. Next-line, DIP, FDIP and SHIFT. Moreover, the contribution of BTB misses in overall squashes is especially evident in DB2, where about 75% of pipeline squashes are caused by BTB misses.

Only Boomerang and Confluence target BTB misses and their associated pipeline squashes. Both techniques are able to eliminate more than 85% of BTB miss-induced squashes. Compared to Confluence, Boomerang is generally more effective, exceeding Confluence's squash reduction by over 10%, on average. The reason Boomerang is more effective is because it detects every BTB miss and fills it, thus ensuring that the execution stays on the correct path. In contrast, Confluence does not detect BTB misses; rather, it relies on a prefetcher to avoid them altogether. The downside of Confluence's approach is that if an L1-I prefetch is incorrect or not timely (i.e., has not reached the L1-I before the front end), the branches corresponding to the block are absent from the BTB. In these circumstances, Confluence's front end follows a sequential instruction stream, as if there were no branch instructions present.

By eliminating BTB misses, Boomerang and Confluence achieve almost 2 times reduction in total squashes compared to all other configurations. It is also important to note that some of the eliminated BTB misses can still cause pipeline squashes due to direction/target misprediction. For example, as shown in FIG. 9, on average SHIFT sees 10.22 squashes per 1K (one thousand) instructions due to branch direction/target mispredictions. This number rises to eleven squashes per kilo-instruction for Confluence due to additional direction and target mispredictions incurred by the prefilled BTB entries. However, as evident from the figure, the incidence of these additional squashes is negligible.

6B. Front-End Stall Cycles Covered

Figure 10:
FIG. 10 shows a series of bar charts comprising a percentage of front-and stall cycles covered with a 2 kB entry BTB over a no-prefetch baseline for each of the six different test program applications and six different prefetch strategies.

To show the effectiveness of different L1-I prefetching techniques, we present the number of front-end stall cycles covered by them in FIG. 10. The average coverage is similar for all control-flow-aware prefetchers; however, there are important differences across the individual benchmarks. On average, Boomerang eliminates 61% of the stall cycles % and slightly outperforms performing similarly to Confluence, which covers 60% of stall cycles. Upon closer inspection, it can be seen that Boomerang performs better than Confluence on four out of six applications: Apache, Nutch, Streaming and Zeus. On these, Boomerang benefits from fast accesses to local state (i.e., its branch prediction structures). In contrast, the SHIFT prefetcher that Confluence relies on must access LLC-embedded history metadata. Therefore, every time SHIFT mispredicts an instruction cache block access sequence, it may first need to load the correct sequence from the LLC before starting issuing prefetches on the correct path. In contrast, Boomerang can start issuing prefetches on the correct path as soon as a misprediction is detected.

On the two other applications, Oracle and DB2, Boomerang may on some measures be surpassed by Confluence. This can happen if there is a high BTB miss rate, which forces Boomerang to frequently stall for prefilling each BTB miss. Because no BTB-directed instruction prefetches are generated while a BTB miss is pending, instruction stall cycle coverage may suffer in some cases.

It is also interesting to note that FDIP and SHIFT can in some situations slightly better coverage than Boomerang and Confluence, even though the latter two techniques rely on the respective former mechanisms for instruction prefetching. The reason for this seeming paradox lies in the fact that the data in FIG. 10 shows only the correct-path stall cycles covered. Meanwhile, wrong-path accesses may prefetch instruction blocks on the eventually-correct path, thus effectively reducing stall cycles. As FDIP and SHIFT go on the wrong path more frequently than Boomerang and Confluence due to more frequent BTB misses (FIG. 9), their wrong-path prefetches lower the stall cycles on the correct path.

6C. Performance Analysis

Figure 11:
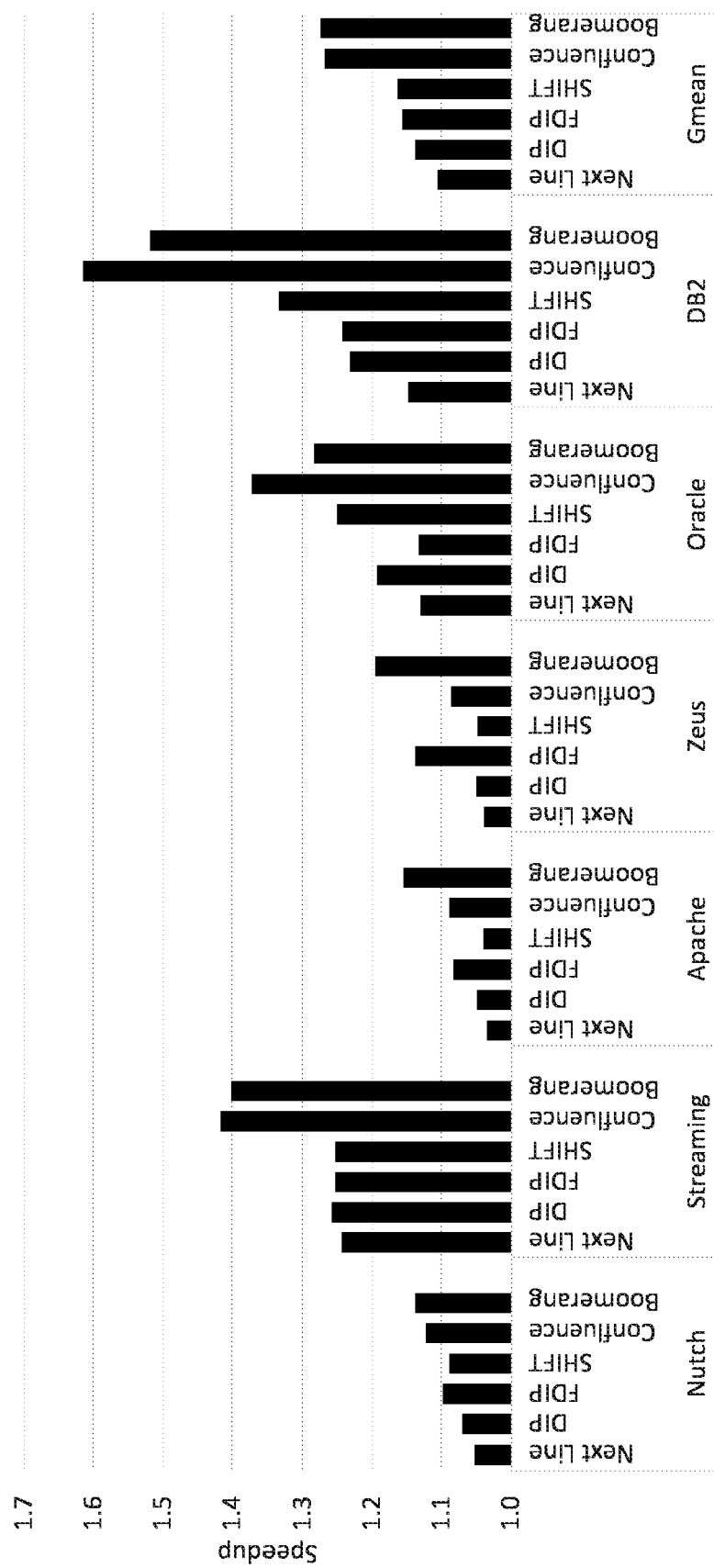
FIG. 11 shows a series of bar charts in which speed up with a 2 kB entry BTB over and over-prefetch baseline is plotted for each of the six different test program applications and six different prefetch strategies.

FIG. 11 shows the performance improvements for different instruction supply mechanisms over a baseline without any instruction/BTB prefetching. The results follow those of FIG. 9 and FIG. 10. Boomerang, on average, provides 28% speedup over the baseline, outperforming Confluence by 1%. Similar to the stall cycle coverage results, Boomerang lags behind Confluence on Oracle and DB2 due to lower stall cycle coverage. For Zeus and Apache, Boomerang is seen to outperform Confluence by a good margin due to the combination of higher stall cycle coverage and fewer pipeline squashes.

It is worth noting that the complete control flow delivery mechanisms, Boomerang and Confluence, outperform the instruction prefetchers, including state-of-the-art SHIFT and DIP, by a large margin, averaging 11%, by eliminating pipeline squashes on top of the instruction cache stalls. This result underscores one of the advantages of complete control flow delivery as opposed to just L1-I prefetching.

6D. Boomerang Vs Confluence: Storage, Complexity and Energy

We first compare the storage requirements of Boomerang and Confluence. The baseline architecture, without any prefetching, maintains a BTB and branch predictor to guide the instruction fetch engine. An FTQ of a few entries is employed to buffer the fetch addresses before they can be used to access the L1-I. A prefetch buffer can be employed by L1-I prefetchers to limit L1-I pollution.

Given all the components in baseline, Boomerang requires minimal or fewer additional hardware to enable both L1-I and BTB prefetching. First, it uses a deeper FTQ to detect and prefetch the missing L1-I and BTB entries ahead of the core front-end. Each FTQ entry contains the start address of the basic block (46-bits) and its size (5-bits). Boomerang uses a 32 entry FTQ therefore requiring 204 bytes of storage. Second, Boomerang employs a 32 entry BTB prefetch buffer to avoid BTB pollution. Each buffer entry contains a tag (46-bits), target address (30-bits, maximum offset in SPARC), branch type (3-bits) and basic block size (5-bits). Therefore, the 32 entry BTB prefetch buffer requires 336 bytes of storage. Thus, the total storage requirement of Boomerang is 540 bytes.

Confluence, on the other hand, employs a 32K-entry instruction history table and an 8K-entry index table for L1-I prefetching. To store the index table, Confluence extends the LLC tag array, requiring 240 KB of dedicated storage. The instruction history table is virtualized into the LLC. As such, it does not require dedicated storage but does result in a lower effective LLC capacity.

On the complexity side, Boomerang is simpler than Confluence. The complexity of Confluence stems from the following factors:

System Level Support: Confluence reserves a portion of physical address space to store instruction history in LLC. Furthermore, the cache lines holding the history metadata must be pinned. To fulfil these requirements Confluence requires system-level support. Boomerang, on the other hand, is transparent to the software stack.

LLC Tag Array Extension: Confluence extends LLC tag array to store the index table. Therefore, the storage cost becomes a factor of LLC size in addition to instruction history size. For an 8 MB LLC and 32K entry instruction history, the LLC tag array extension results in 240 KB of storage overhead. On the contrary, Boomerang does not require any changes to LLC.

Workload Consolidation: Confluence virtualizes instruction history in LLC and shares it among all the cores to reduce per core storage overhead. However, this technique is effective only when all the cores are running the same application. As the number of applications running on the CMP increases, Confluence needs to store one instruction history table per application in LLC, reducing the effective LLC capacity by over 200 KB with each additional application. Boomerang does not carve LLC capacity in any way.

Increased On-chip Interconnect Traffic: As the instruction history and index tables are stored in LLC, Confluence generates additional network traffic to retrieve the prefetching metadata from the LLC. Boomerang, on the other hand, uses only core-private state from its local BTB and branch direction predictor.

History Generation: Confluence relies on one of the cores to generate instruction history which is then shared among all the cores to issue prefetches. If the history generator core switches to a housekeeping task, such as garbage collection, the history generation will suffer, which might adversely affect the prefetch accuracy in other cores. Prefetch generation in Boomerang, on the other hand, is private to each core and hence, is not affected by the activities of other cores.

All the above factors make Confluence more complex than Boomerang, whose modest control logic requirements are for:

Halting fetch address generation on a BTB miss.
Prioritizing BTB misses over other prefetch requests.
Looking up an entry in the BTB prefetch buffer in parallel with the BTB.
Issuing prefetches for next-2-lines on a BTB miss.

Even though complexity is not straightforward to quantify, in practice it has a large impact on processing circuitry design decision.

In terms of energy-efficiency, Boomerang has advantages over prior techniques, including Confluence, at least because it does not introduce any dedicated storage-intensive hardware structures or cause additional metadata movement. In general, however, prior work has shown that even for storage-intensive prefetchers, the energy costs comprise a small fraction of the processor's total power budget [ref. 25].

6E. Sensitivity Analysis

1. Next-N-Line Prefetches on a BTB Miss

Figure 12:
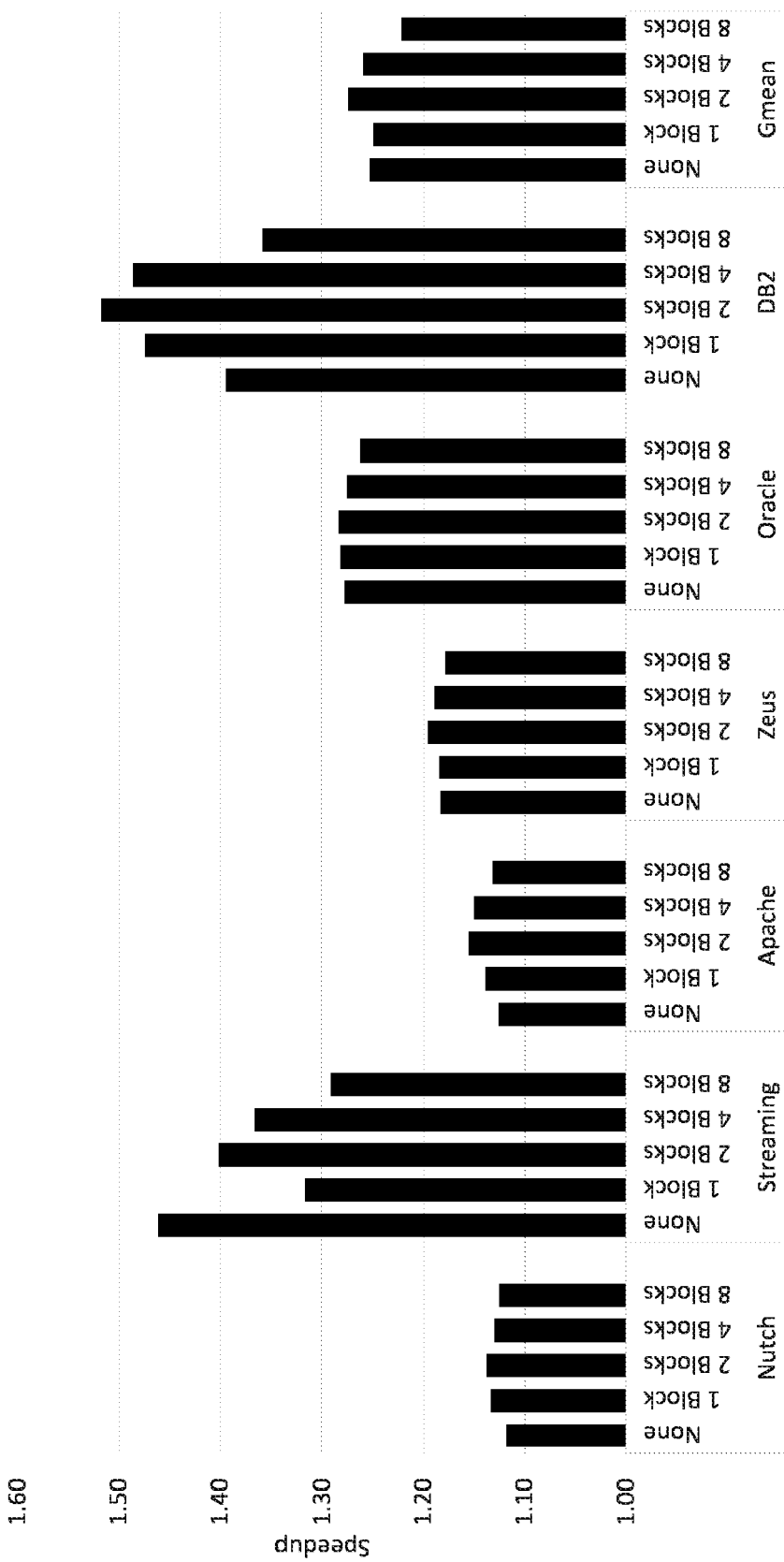
FIG. 12 shows a series of bar charts for the six different test program applications plotting for each of the six test program applications and for a range of different next-N-block prefetching in the event of detected BTB miss served by the LLC in a prefetch strategy according to the present technique (denoted "Boomerang")

As discussed in Section 4.C1 above, on a BTB miss that cannot be prefilled from L1-I, Boomerang issues prefetch for next two sequential cache blocks in addition to the block that contains the missing BTB entry. FIG. 12 shows the sensitivity of performance to the number of next-N-blocks prefetched. As the figure shows, prefetching next-2-blocks provides the best performance in the simulations. The effect of prefetching next-N-blocks is notable especially in DB2, where prefetching next-2-blocks provide 12% performance improvement over not prefetching at all. It is also important to note that prefetching more than two blocks is likely to result in performance degradation compared to next-2-blocks as erroneous prefetches delay the useful blocks.

Streaming is an exception where not prefetching any block provides the maximum performance. Prefetching next-N-blocks degrades performance because the majority of these blocks end up being discarded, and thus polluting network and LLC bandwidth and L1-I prefetch buffer. Next-1-block prefetching performs worse than next-2 and next-4-block prefetching due to the taken branches. These branches skip the next sequential block and jump to the blocks following it. Therefore, the next-1-block prefetching suffers from particularly poor accuracy as it fails to prefetch useful blocks, whereas next-2 and next-4-block prefetching does bring in some useful blocks even for taken branches.

2. Effect of LLC Round-Trip Latency

FIG. 13 shows the speed up of the different techniques under a lower LLC round-trip latency. In particular, a wide crossbar interconnect is modelled that lowers the average LLC round-trip latency from 30 cycles in the mesh down to 18 cycles.

As the FIG. 13, the general trends remain the same as in a mesh-based NOC. Boomerang maintains its performance advantage over Confluence even at the lower LLC latency. The absolute benefits of all schemes may reduce, however, because the L1-I misses are now less costly due to the lower LLC latency.

7. Conclusion for Simulation Results

Effective control flow delivery is an important factor for server workloads with their massive instruction footprints. Indeed, instruction cache and BTB misses can cause a significant performance degradation. Although there have been a number of techniques proposed in the past to address the control flow delivery bottleneck, every one of them requires separate metadata structures, translating into significant storage and complexity costs. Examples of the present technique such as the boomerang examples described above may provide a metadata-free architecture for control flow delivery. Boomerang leverages a branch-predictor-directed prefetcher that uses existing in-core metadata for solving the instruction cache problem. Contrary to conventional wisdom, we have shown that a branch-predictor-directed prefetcher can be effective in discovering the future instruction stream despite limited branch predictor accuracy and a modest BTB storage budget. It has been demonstrated via the simulations described and illustrated in this specification that BTB misses can be identified and filled by the branch-predictor-directed instruction prefetcher at reduced additional cost and lower complexity. By eliminating or at least reducing BTB misses, Boomerang is able to avoid a large fraction of performance-degrading pipeline flushes. The simulation results show that Boomerang is able to match the performance of Confluence, the state-of-the-art control-flow delivery scheme, without its associated storage and complexity costs.

REFERENCES

[1] A. Ailamaki, D. J. DeWitt, M. D. Hill, and D. A. Wood, "DBMSs on a modern processor: Where does time go?," in International Conference on Very Large Data Bases, pp. 266-277, 1999.

[2] M. Ferdman, A. Adileh, Y. O. Koç berber, S. Volos, M. Alisafaee, D. Jevdjic, C. Kaynak, A. D. Popescu, A. Ailamaki, and B. Falsafi, "Clearing the clouds: a study of emerging scale-out workloads on modern hardware," in ASPLOS, pp. 37-48, 2012.

[3] N. Hardavellas, M. Ferdman, B. Falsafi, and A. Ailamaki, "Reactive NUCA: near-optimal block placement and replication in distributed caches," in International Symposium on Computer Architecture, pp. 184-195, 2009.

[4] S. Kanev, J. P. Darago, K. M. Hazelwood, P. Ranganathan, T. Moseley, G. Wei, and D. M. Brooks, "Profiling a warehouse-scale computer," in International Symposium on Computer Architecture, pp. 158-169, 2015.

[5] K. Keeton, D. A. Patterson, Y. Q. He, R. C. Raphael, and W. E. Baker, "Performance characterization of a quad pentium pro SMP using OLTP workloads," in International Symposium on Computer Architecture, pp. 15-26, 1998.

[6] P. Ranganathan, K. Gharachorloo, S. V. Adve, and L. A. Barroso, "Performance of database workloads on shared-memory systems with out-of-order processors," in International Conference on Architectural Support for Programming Languages and Operating Systems, pp. 307-318, 1998.

[7] A. Kolli, A. G. Saidi, and T. F. Wenisch, "RDIP: return-address-stack directed instruction prefetching," in The 46th Annual IEEE/ACM International Symposium on Microarchitecture, MICRO-46, Davis, Calif., USA, Dec. 7-11, 2013, pp. 260-271, 2013.

[8] A. Ramirez, L. A. Barroso, K. Gharachorloo, R. Cohn, J. Larriba-Pey, P. G. Lowney, and M. Valero, "Code Layout Optimizations for Transaction Processing Workloads," in International Symposium on Computer Architecture, pp. 155-164, 2001.

[9] M. Ferdman, T. F. Wenisch, A. Ailamaki, B. Falsafi, and A. Moshovos, "Temporal Instruction Fetch Streaming," in International Symposium on Microarchitecture, pp. 1-10, 2008.

[10] M. Ferdman, C. Kaynak, and B. Falsafi, "Proactive Instruction Fetch," in International Symposium on Microarchitecture, pp. 152-162, 2011.

[11] C. Kaynak, B. Grot, and B. Falsafi, "SHIFT: Shared History Instruction Fetch for Lean-core Server Processors," in International Symposium on Microarchitecture, pp. 272-283, 2013.

[12] J. Bonanno, A. Collura, D. Lipetz, U. Mayer, B. Prasky, and A. Saporito, "Two Level Bulk Preload Branch Prediction," in International Symposium on High-Performance Computer Architecture, pp. 71-82, 2013.

[13] I. Burcea and A. Moshovos, "Phantom-btb: a virtualized branch target buffer design," in Proceedings of the 14th International Conference on Architectural Support for Programming Languages and Operating Systems, ASPLOS 2009, Washington, D.C., USA, Mar. 7-11, 2009, pp. 313-324, 2009.

[14] C. Kaynak, B. Grot, and B. Falsafi, "Confluence: Unified Instruction Supply for Scale-Out Servers," in International Symposium on Microarchitecture, pp. 166-177, 2015.

[15] ThunderX ARM Processors: Workload Optimized Processors for Next Generation Data Center and Cloud Applications. www.cavium.com/ThunderX ARM Processors.html.
[16] Oracle SPARC T5-2 Server. www.oracle.com/servers/sparc/t5-2/index.html.
[17] P. Lotfi-Kamran, B. Grot, M. Ferdman, S. Volos, O. Kocberber, J. Picorel, A. Adileh, D. Jevdjic, S. Idgunji, E. Ozer, and B. Falsafi, "Scale-out Processors," in International Symposium on Computer Architecture, 2012.
[18] I.-C. K. Chen, C.-C. Lee, and T. N. Mudge, "Instruction Prefetching Using Branch Prediction Information," in International Conference on Computer Design, pp. 593-601, 1997.
[19] G. Reinman, B. Calder, and T. Austin, "Fetch Directed Instruction Prefetching," in International Symposium on Microarchitecture, pp. 16-27, IEEE, 1999.
[20] L. Spracklen, Y. Chou, and S. G. Abraham, "Effective Instruction Prefetching in Chip Multiprocessors for Modern Commercial Applications," in 11th International Symposium on High-Performance Computer Architecture, pp. 225-236, 2005.
[21] A. Seznec and P. Michaud, "A case for (partially) tagged geometric history length branch prediction," J. Instruction-Level Parallelism, vol. 8, 2006.
[22] T. Yeh and Y. N. Patt, "A comprehensive instruction fetch mechanism for a processor supporting speculative execution," in International Symposium on Microarchitecture, pp. 129-139, 1992.
[23] T. F. Wenisch, R. E. Wunderlich, M. Ferdman, A. Ailamaki, B. Falsafi, and J. C. Hoe, "Simflex: Statistical sampling of computer system simulation," IEEE Micro, vol. 26, no. 4, pp. 18-31, 2006.
[24] R. E. Wunderlich, T. F. Wenisch, B. Falsafi, and J. C. Hoe, "SMARTS:accelerating microarchitecture simulation via rigorous statistical sampling," in International Symposium on Computer Architecture, pp. 84-95, 2003.
[25] J. N. Amaral and J. Torrellas, eds., International Conference on Parallel Architectures and Compilation, A C M, 2014.

EXAMPLES

The following numbered examples pertain to the present technique.
1. Data processing apparatus comprising:
branch prediction circuitry to predict an outcome of a branch instruction, the branch prediction circuitry having a Branch Target Buffer, BTB, to store a plurality of BTB entries, each BTB entry comprising both a branch indexing address and a predicted branch target address for a branch instruction, the branch indexing address to map to a program counter of an instruction being fetched wherein a BTB hit returns a predicted branch target address corresponding to the program counter;
a fetch target queue having a plurality of storage slots to receive entries corresponding to a sequence of instruction addresses, at least one of the sequence having been predicted using the branch prediction circuitry;
a fetch engine to fetch and return from a memory, for execution by a processor, instructions corresponding to instruction addresses taken from a top of the fetch target queue, wherein the fetch target queue is to decouple the branch predictor from the fetch engine to allow the branch prediction circuitry to run ahead of the fetch engine; and
a prefetch engine to read an entry from the fetch target queue and to send a prefetch probe to the memory to determine if at least one corresponding instruction is stored in an instruction cache;
wherein when the BTB detects a BTB miss for the program counter when attempting to populate a storage slot of the fetch target queue, the BTB is to trigger issuance of a BTB miss probe to the memory to fetch at least one instruction from the memory to resolve the BTB miss.
2. Data processing apparatus according to example 1, comprising a multiplexer via which instruction read requests are sent to the memory, the multiplexer to receive the BTB miss probe and to receive the prefetch probe and to control the data processing apparatus to prioritise servicing the BTB miss probe over the prefetch probe.
3. Data processing apparatus according to example 2, wherein the multiplexer is to receive a demand fetch request from the fetch engine to fetch an instruction from the memory and wherein the demand fetch request is accorded a higher priority than the BTB miss probe.
4. Data processing apparatus according to any one of examples 1 to 3, wherein the BTB triggers one of the prefetch engine, a fetch address circuit or the branch prediction unit to issue the BTB probe to the memory.
5. Data processing apparatus according to any one of the preceding examples, wherein the BTB miss probe first probes a first level, L1, of the instruction cache to resolve the BTB miss and if the L1 instruction cache does not contain data to resolve the BTB miss, then the BTB miss probe controls sequential access to lower hierarchical levels of the memory until data to resolve the BTB miss is retrieved.
6. Data processing apparatus according to any one of the preceding examples, wherein the branch prediction circuitry is responsive to the BTB miss to stop populating entries of the fetch target queue pending resolution of the BTB miss via the BTB miss probe.
7. Data processing apparatus according to any one of the preceding examples, wherein at least one of the BTB entries comprises a basic block of instructions, wherein a basic block is a plurality of instructions corresponding to an instruction sequence in which a last instruction of the sequence is a branch instruction.
8. Data processing apparatus according to any one of the preceding examples, comprising a predecoder having decode circuitry to, in response to the BTB miss probe, decode instructions of a cache block selected depending upon the program counter corresponding to the BTB miss, to extract at least one branch instruction and any corresponding branch target to resolve the BTB miss.
9. Data processing apparatus according to example 7, wherein a first branch instruction found in the decoded instructions of the cache block after the start address of the basic block corresponding to the BTB miss, it is identified as a terminating branch of a basic block required to resolve the BTB miss.
10. Data processing apparatus according to example 9, wherein the terminating branch of the basic block required to resolve the BTB miss and a corresponding branch target is written to the BTB to resolve the BTB miss.
11. Data processing apparatus according to example 9 or example 10, wherein if no branch instruction is found in the decoded instructions of the cache block after the start address of the basic block corresponding to the BTB miss, the data processing apparatuses to retrieve a next sequential cache block to send to the predecoder in response to the BTB miss probe.

12. Data processing apparatus according to any one of examples 8 to 11, comprising a BTB prefetch buffer to store one or more branch instructions and corresponding branch targets extracted by the predecoder from a retrieved cache block in response to the BTB miss probe.

13. Data processing apparatus according to example 12, wherein the BTB prefetch buffer is to store, when present, one or more branch instructions and corresponding targets extracted by the predecoder other than the terminating branch of a basic block required to resolve the BTB miss.

14. Data processing apparatus according to example 12 or example 13, wherein the branch prediction circuitry is to check the BTB prefetch buffer in the event of a BTB miss and if an entry corresponding to the BTB miss is found in the BTB prefetch buffer, to copy the entry to the BTB to resolve the BTB miss.

15. The data processing apparatus of example 14, wherein the data processing apparatus is to suppress issuance of the BTB miss probe when the entry corresponding to the BTB miss is currently stored in the BTB prefetch buffer.

16. Data processing apparatus according to any one of examples 6 to 11 comprising a BTB miss buffer, arranged to store an instruction address corresponding to the BTB miss, pending output of the BTB miss probe.

17. Data processing apparatus according to example 16 wherein the BTB miss buffer is to store a start address of the basic block containing the terminating branch of the missing BTB entry.

18. An integrated circuit comprising the data processing apparatus of any one of examples 1 to 17.

19. A server microprocessor comprising the data processing apparatus of any one of examples 1 to 17.

20. A server comprising the server microprocessor of example 19.

21. A data processing method comprising:
  predicting an outcome of a branch instruction;
  storing in a branch target buffer, BTB, a plurality of BTB entries, each BTB entry comprising both a branch indexing address and a predicted branch target address for a branch instruction, the branch indexing address to map to a program counter of an instruction being fetched wherein a BTB hit returns a predicted branch target address corresponding to the program counter;
  storing in one of a plurality of storage slots of a fetch target queue, at least one instruction address predicted using the branch prediction circuitry, the storage slots queueing instructions to be fetched for execution;
  fetching and returning from a memory, for execution by a processor, instructions corresponding to instruction addresses taken from a top of the fetch target queue; and
  reading an entry from the fetch target queue other than the top entry and sending a prefetch probe to the memory to determine if a corresponding instruction is stored in an instruction cache of the memory; and
  triggering issuance of a BTB miss probe to the memory, in response to detection by the BTB of a BTB miss for the program counter when populating the fetch target queue, the BTB miss probe to initiate fetching at least one instruction from the memory to resolve the BTB miss.

22. Data processing method according to example 21, comprising suspending population of entries of the fetch target queue pending resolution of the BTB miss by the BTB miss probe.

23. Machine-readable instructions provided on a storage medium or on a transmission medium, the instructions upon execution by one or more processors to cause the processor(s) to:
  predict an outcome of a branch instruction;
  store in a branch target buffer, BTB, a plurality of BTB entries, each BTB entry comprising both a branch indexing address and a predicted branch target address for a branch instruction, the branch indexing address to map to a program counter of an instruction being fetched wherein a BTB hit returns a predicted branch target address corresponding to the program counter;
  store in one of a plurality of storage slots of a fetch target queue, at least one instruction address predicted as a branch target using the branch prediction circuitry, the storage slots queueing instructions to be fetched for execution;
  fetch and return from a memory for execution, instructions corresponding to an instruction address taken from a top of the fetch target queue; and
  read an entry from the fetch target queue other than the top entry and send a prefetch probe to the memory to determine if at least one corresponding instruction is stored in an instruction cache of the memory; and
  trigger issuance of a BTB miss probe to the memory, in response to detection by the BTB of a BTB miss for the program counter when populating the fetch target queue, the BTB miss probe to initiate fetching of at least one instruction from the memory to resolve the BTB miss.

24. Machine readable instructions as in example 23, comprising instructions to cause the processor(s) to:
  in response to detection of the BTB miss, to stop populating entries of the fetch target queue pending resolution of the BTB miss.

A data processing apparatus according to the present technique may be provided as a self-contained unit, such as a branch prediction and instruction prefetching unit for use with a microprocessor as a separately supplied component or may be fabricated on the same integrated circuit as one or more microprocessors and supplied as an integral unit. The data processing apparatus according to the present technique may be incorporated in a server microprocessor to form part of a server or may be incorporated in another type of microprocessor or microcontroller, either general or specialised. The data processing apparatus according to the present technique may be incorporated into an electronic apparatus such as, for example, a server, a workstation, a mainframe computer, a personal computer, a tablet computer, a mobile phone, a control system for an automobile or any autonomous vehicle, an embedded system, a household device or an appliance.

One or more software programs or machine-readable instructions that may implement or utilize the various techniques of the examples described herein may be implemented in a high level procedural or object oriented programming language. However, the program(s) may alternatively be implemented in assembly or machine language. In any case, the language may be a compiled or interpreted language, and combined with hardware implementations. The program instructions may be provided on a transitory (e.g. transmission) or a non-transitory (e.g. storage) medium.

Where apparatus components have been described as circuitry or units or engines or the like, the circuitry or unit or engine or the like may be general purpose processor circuitry configured by program code to perform specified processing functions. The circuitry or unit or engine or the like may also be configured by specific modification to the processing hardware. Configuration of the circuitry or unit or engine or the like to perform a specified function may be entirely in hardware, entirely in software or using a combination of hardware modification and software execution.

Machine-readable instructions may be used to configure logic gates of general purpose or special-purpose processing circuitry to perform a specified processing function.

An apparatus component may be implemented, for example, as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices or the like. Executable program code (machine-readable instructions) of an identified component need not be physically located together, but may comprise disparate instructions stored in different locations which, when joined logically together, comprise the component and achieve the stated purpose for the component. Examples may be implemented at least in part in a cloud computing environment, where processing functions are distributed across different geographical locations.

In this description the phrase at least one of "A" or "B" (or "C" and so on) is intended to include all individual elements and all combinations of the stated list (A, B, C etc.). For example, "at least one of: A, B or C" is intended to include the alternatives of: just A; just B; just C; A and B; A and C; B and C; or A and B and C.

The invention claimed is:

1. A data processing apparatus comprising:
   branch prediction circuitry to predict an outcome of a branch instruction, the branch prediction circuitry having a Branch Target Buffer, BTB, to store a plurality of BTB entries, each BTB entry comprising both a branch indexing address and a predicted branch target address for a branch instruction, the branch indexing address to map to a program counter of an instruction being fetched wherein a BTB hit returns a predicted branch target address corresponding to the program counter;
   a fetch target queue having a plurality of storage slots to receive entries corresponding to a sequence of instruction addresses, at least one of the sequence having been predicted using the branch prediction circuitry;
   a fetch engine to fetch and return from a memory, for execution by a processor, instructions corresponding to instruction addresses taken from a top of the fetch target queue, wherein the fetch target queue is to decouple the branch prediction circuitry from the fetch engine to allow the branch prediction circuitry to run ahead of the fetch engine;
   a prefetch engine to read an entry from the fetch target queue and to send a prefetch probe to the memory to determine if at least one corresponding instruction is stored in an instruction cache of the memory; and
   a predecoder having decode circuitry;
   wherein when the BTB detects a BTB miss for the program counter when attempting to populate a storage slot of the fetch target queue, the BTB is to trigger issuance of a BTB miss probe to the memory to fetch at least one instruction from the memory to resolve the BTB miss, and wherein, in response to the BTB miss probe, the decode circuitry of the predecoder is to decode instructions of a cache block selected depending upon the program counter corresponding to the BTB miss, to extract at least one branch instruction and any corresponding branch target to resolve the BTB miss.

2. The data processing apparatus according to claim 1, comprising a multiplexer via which instruction read requests are sent to the memory, the multiplexer to receive the BTB miss probe and to receive the prefetch probe and to control the data processing apparatus to prioritise servicing the BTB miss probe over the prefetch probe.

3. The data processing apparatus according to claim 2, wherein the multiplexer is to receive a demand fetch request from the fetch engine to fetch an instruction from the memory and wherein the demand fetch request is accorded a higher priority than the BTB miss probe.

4. The data processing apparatus according to claim 1, wherein the BTB triggers one of the prefetch engine, a fetch address circuit or the branch prediction unit to issue the BTB probe to the memory.

5. The data processing apparatus according to claim 1, wherein the BTB miss probe first probes a first level, L1, of the instruction cache to resolve the BTB miss and if the L1 instruction cache does not contain data to resolve the BTB miss, then the BTB miss probe controls sequential access to lower hierarchical levels of the memory until data to resolve the BTB miss is retrieved.

6. The data processing apparatus according to claim 1, wherein the branch prediction circuitry is responsive to the BTB miss to stop populating entries of the fetch target queue pending resolution of the BTB miss via the BTB miss probe.

7. The data processing apparatus according to claim 1, wherein at least one of the BTB entries comprises a basic block of instructions, wherein a basic block is a plurality of instructions corresponding to an instruction sequence in which a last instruction of the sequence is a branch instruction.

8. The data processing apparatus according to claim 7, wherein a first branch instruction found in the decoded instructions of the cache block after the start address of the basic block corresponding to the BTB miss is identified as a terminating branch of a basic block required to resolve the BTB miss.

9. The data processing apparatus according to claim 8, wherein the terminating branch of the basic block required to resolve the BTB miss and a corresponding branch target is written to the BTB to resolve the BTB miss.

10. The data processing apparatus according to claim 8, wherein if no branch instruction is found in the decoded instructions of the cache block after the start address of the basic block corresponding to the BTB miss, the data processing apparatus is to retrieve a next sequential cache block to send to the predecoder in response to the BTB miss probe.

11. The data processing apparatus according to claim 1, comprising a BTB prefetch buffer to store one or more branch instructions and corresponding branch targets extracted by the predecoder from a retrieved cache block in response to the BTB miss probe.

12. The data processing apparatus according to claim 11, wherein the BTB prefetch buffer is to store, when present, one or more branch instructions and corresponding targets extracted by the predecoder other than the terminating branch of a basic block required to resolve the BTB miss.

13. The data processing apparatus according to claim 11, wherein the branch prediction circuitry is to check the BTB prefetch buffer in the event of a BTB miss and if an entry corresponding to the BTB miss is found in the BTB prefetch buffer, to copy the entry to the BTB to resolve the BTB miss.

14. The data processing apparatus of claim 13, wherein the data processing apparatus is to suppress issuance of the BTB miss probe when the entry corresponding to the BTB miss is currently stored in the BTB prefetch buffer.

15. The data processing apparatus according to claim 6 comprising a BTB miss buffer, arranged to store an instruction address corresponding to the BTB miss, pending output of the BTB miss probe.

16. A data processing method comprising:
predicting an outcome of a branch instruction; storing in a branch target buffer, BTB, a plurality of BTB entries, each BTB entry comprising both a branch indexing address and a predicted branch target address for a branch instruction, the branch indexing address to map to a program counter of an instruction being fetched wherein a BTB hit returns a predicted branch target address corresponding to the program counter;
storing in one of a plurality of storage slots of a fetch target queue, at least one instruction address predicted using the branch prediction circuitry, the storage slots queueing instructions to be fetched for execution;
fetching and returning from a memory, for execution by a processor, instructions corresponding to instruction addresses taken from a top of the fetch target queue; and
reading an entry from the fetch target queue other than the top entry and sending a prefetch probe to the memory to determine if a corresponding instruction is stored in an instruction cache of the memory; and
triggering issuance of a BTB miss probe to the memory, in response to detection by the BTB of a BTB miss for the program counter when populating the fetch target queue, the BTB miss probe to initiate fetching at least one instruction from the memory to resolve the BTB miss; and
decoding, using a predecoder, instructions of a cache block selected depending upon the program counter corresponding to the BTB miss, to extract at least one branch instruction and any corresponding branch target to resolve the BTB miss.

17. The data processing method according to claim 16, comprising suspending population of entries of the fetch target queue pending resolution of the BTB miss by the BTB miss probe.

18. Machine-readable instructions provided on a non-transitory medium, the instructions upon execution by one or more processors to cause the processor(s) to:
predict an outcome of a branch instruction; store in a branch target buffer, BTB, a plurality of BTB entries, each BTB entry comprising both a branch indexing address and a predicted branch target address for a branch instruction, the branch indexing address to map to a program counter of an instruction being fetched wherein a BTB hit returns a predicted branch target address corresponding to the program counter;
store in one of a plurality of storage slots of a fetch target queue, at least one instruction address predicted as a branch target using the branch prediction circuitry, the storage slots queueing instructions to be fetched for execution; fetch and return from a memory for execution, instructions corresponding to an instruction address taken from a top of the fetch target queue; and
read an entry from the fetch target queue other than the top entry and send a prefetch probe to the memory to determine if at least one corresponding instruction is stored in an instruction cache of the memory; and
trigger issuance of a BTB miss probe to the memory, in response to detection by the BTB of a BTB miss for the program counter when populating the fetch target queue, the BTB miss probe to initiate fetching of at least one instruction from the memory to resolve the BTB miss; and
decode, using a predecoder, instructions of a cache block selected depending upon the program counter corresponding to the BTB miss, to extract at least one branch instruction and any corresponding branch target to resolve the BTB miss.

19. The machine readable instructions as claimed in claim 18, comprising instructions to cause the processor(s) to: in response to detection of the BTB miss, to stop populating entries of the fetch target queue pending resolution of the BTB miss.

\* \* \* \* \*